(12) United States Patent
Ishihara et al.

(10) Patent No.: US 7,986,873 B2
(45) Date of Patent: Jul. 26, 2011

(54) OPTICAL UNIT WITH SHAKE CORRECTING FUNCTION AND SHAKE CORRECTION CONTROL METHOD THEREFOR

(75) Inventors: Hisahiro Ishihara, Nagano (JP); Toshiyuki Karasawa, Nagano (JP); Shinji Minamisawa, Nagano (JP); Yuichi Takei, Nagano (JP); Tadashi Takeda, Nagano (JP); Katsushige Yanagisawa, Nagano (JP); Akihiro Nagata, Nagano (JP); Kiyoshi Miyazaki, Nagano (JP)

(73) Assignee: Nidec Sankyo Corporation (JP)

( * ) Notice: Subject to any disclaimer, the term of this patent is extended or adjusted under 35 U.S.C. 154(b) by 0 days.

(21) Appl. No.: 12/582,584

(22) Filed: Oct. 20, 2009

(65) Prior Publication Data
US 2010/0098394 A1 Apr. 22, 2010

(30) Foreign Application Priority Data

Oct. 20, 2008 (JP) .................................. 2008-270142
Sep. 19, 2009 (JP) .................................. 2009-218197

(51) Int. Cl.
*G03B 17/00* (2006.01)
*H04N 5/228* (2006.01)
*G02B 27/64* (2006.01)

(52) U.S. Cl. .................. 396/55; 348/208.2; 348/208.11; 359/557

(58) Field of Classification Search .................... 396/52, 396/53, 55; 348/208.99, 208.2, 208.4, 208.5, 348/208.7, 208.11; 359/554, 557
See application file for complete search history.

(56) References Cited

U.S. PATENT DOCUMENTS
2008/0085108 A1* 4/2008 Sekino et al. .................. 396/55

FOREIGN PATENT DOCUMENTS
JP 2007-129295 A 5/2007

* cited by examiner

*Primary Examiner* — Rochelle-Ann J Blackman
(74) *Attorney, Agent, or Firm* — Cantor Colburn LLP

(57) ABSTRACT

An optical unit with shake correcting function may include a movable module on which at least an optical element is mounted, a fixed body which supports the movable module, a shake detection sensor which detects a shake of the movable module, a drive mechanism for shake correction for swinging the movable module on the fixed body on the basis of a detection result of the shake detection sensor to correct the shake of the movable module, and a control section which controls the drive mechanism for shake correction on the basis of the detection result of the shake detection sensor. The shake detection sensor is a gyroscope mounted on the movable module and the control section controls the drive mechanism for shake correction so as to cancel the shake detected by the gyroscope.

12 Claims, 20 Drawing Sheets

Fig. 2(a)
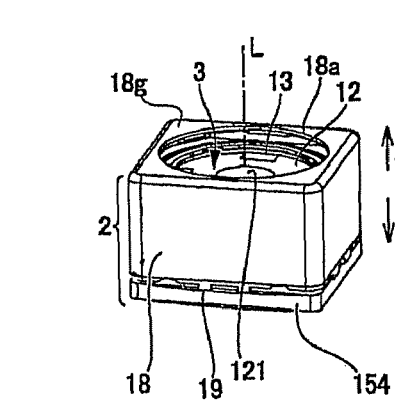
Fig. 2(b)
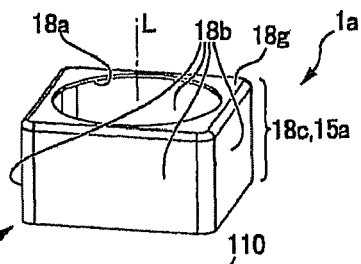
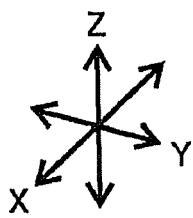

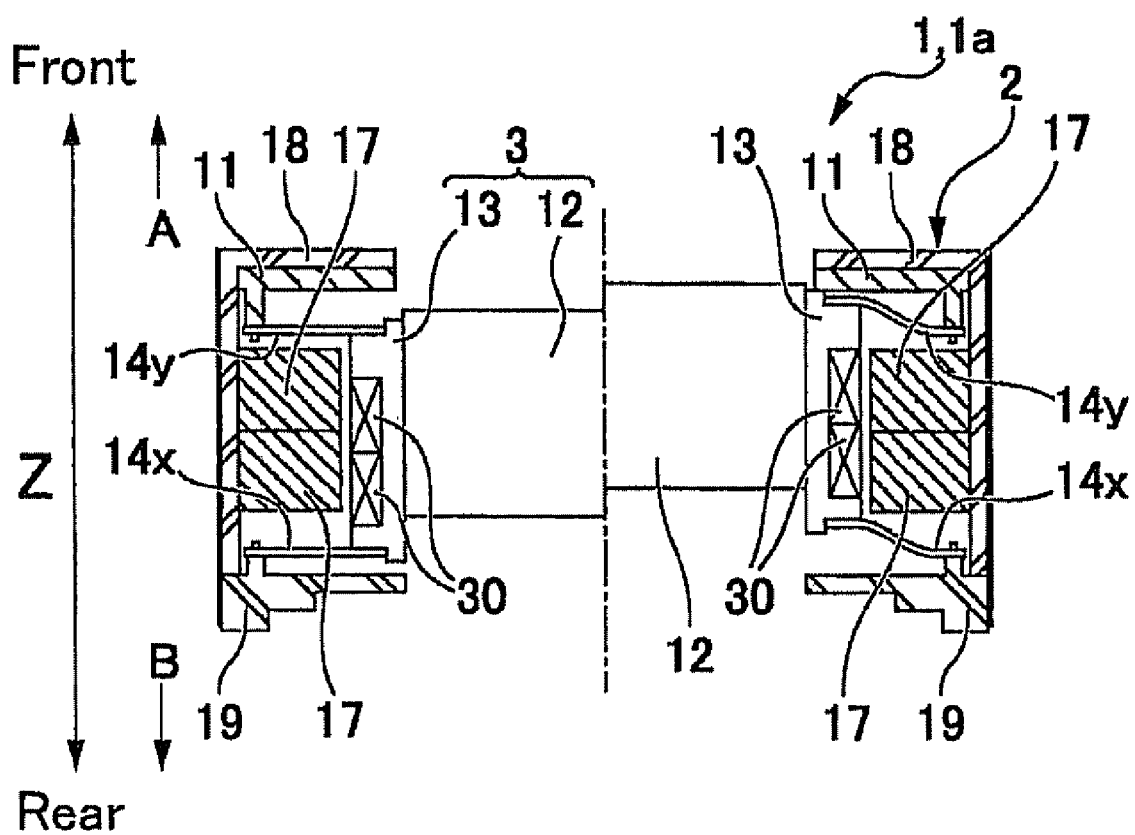

US 7,986,873 B2

OPTICAL UNIT WITH SHAKE CORRECTING FUNCTION AND SHAKE CORRECTION CONTROL METHOD THEREFOR

CROSS REFERENCE TO RELATED APPLICATION

The present invention claims priority under 35 U.S.C. §119 to Japanese Application No. 2008-270142 filed Oct. 20, 2008, and Japanese Application No. 2009-218197 filed Sep. 19, 2009, the entire contents of which are incorporated herein by reference.

FIELD OF THE INVENTION

An embodiment of the present invention may relate to an optical unit with shake correcting function in which a movable module having a lens is swung to correct a shake such as a hand shake and may relate to a shake correction control method for the optical unit with shake correcting function.

BACKGROUND OF THE INVENTION

In a photographic optical device, which is mounted on a cell phone or a digital camera, a laser beam pointer, or an optical instrument such as a portable projection display device or a projection display device for a car, a shake is easily occurred in its optical axis when a shake or external vibration is transmitted.

In order to prevent this problem, a photographic optical unit which is used, for example, in a portable photographic optical device has been proposed in which an actuator is structured on each of side faces of a movable module, and the movable module is swung around an X-axis and a Y-axis perpendicular to an optical axis direction (Z-axis direction) of the actuator on the basis of a detection result of a shake detection sensor to correct the shake (see Japanese Patent Laid-Open No. 2007-129295).

However, in a conventional optical unit, an angular velocity signal corresponding to a shake is integrated to obtain an angular displacement by a gyroscope which is used as a shake detection sensor and a movable module is displaced so as to correspond to the angular displacement and thus response of correction is not rapid. Further, when the shake correction is to be performed, an angle of the movable module is detected by another sensor to control a difference between a displacement and a command value to be zero. Therefore, the control system becomes complicated and the number of components including the sensor is increased.

SUMMARY OF THE INVENTION

In view of the problems described above, at least an embodiment of the present invention may advantageously provide an optical unit with shake correcting function in which a shake can be rapidly corrected with a simple control system and provide a shake correction control method for the optical unit with shake correcting function.

According to at least an embodiment of the present invention, there may be provided an optical unit with shake correcting function including a movable module on which at least an optical element is mounted, a fixed body which supports the movable module, a shake detection sensor which detects a shake of the movable module, a drive mechanism for shake correction for swinging the movable module on the fixed body on the basis of a detection result of the shake detection sensor to correct the shake of the movable module, and a control section which controls the drive mechanism for shake correction on the basis of the detection result of the shake detection sensor. The shake detection sensor is a gyroscope which is mounted on the movable module and the control section controls the drive mechanism for shake correction so as to cancel the shake detected by the gyroscope.

According to at least an embodiment of the present invention, there may be provided a shake correction control method for an optical unit with shake correcting function having a movable module on which at least an optical element is mounted, a fixed body which supports the movable module, a shake detection sensor which detects a shake of the movable module, and a drive mechanism for shake correction for swinging the movable module on the fixed body on the basis of a detection result of the shake detection sensor to correct the shake of the movable module, includes previously mounting a gyroscope on the movable module as the shake detection sensor, and controlling the drive mechanism for shake correction to cancel a shake detected by the gyroscope.

In accordance with an embodiment of the present invention, a shake is detected by a gyroscope which is used as a shake detection sensor to control the drive mechanism for shake correction so as to cancel the shake. Therefore, since an angular velocity signal is not required to be integrated to obtain a quantity of angular displacement, responsiveness of correction is superior. Further, since the drive mechanism for shake correction is controlled to cancel a shake detected by the gyroscope, a closed loop control can be performed as it is. Therefore, an angle of the movable module is not required to be detected by using another sensor and a difference between a displacement and a command value is not required to be controlled to be zero and thus a structure of a control system can be simplified. Accordingly, the number of components can be reduced and thus cost of the optical unit with shake correcting function can be reduced. Further, a gyroscope is mounted on the movable module, a shake of the movable module can be surely and rapidly detected with a simple structure.

In accordance with an embodiment of the present invention, the movable module and the fixed body are connected with each other through a spring member and, when a frequency of a control signal with which the control section controls the drive mechanism for shake correction is set to be "f1", a resonance frequency of the spring member is set to be "f2", and a detuning frequency of the gyroscope is set to be "f3", the frequency "f1" of the control signal, the resonance frequency "f2" of the spring member, and the detuning frequency "f3" of the gyroscope satisfy the following condition: f1<f2<f3.

In accordance with an embodiment of the present invention, the frequency "f3" of the control signal is restrained by a digital low-pass filter which is provided for a digital signal obtained by means of that an angular velocity signal outputted from the gyroscope is digitized.

In accordance with an embodiment of the present invention, in an open-loop frequency characteristic of a servo gain when the drive mechanism for shake correction is controlled, a gain intersecting point satisfies the following condition: f2<gain intersecting point<f3.

In accordance with an embodiment of the present invention, in an open-loop frequency characteristic of a servo gain when the drive mechanism for shake correction is controlled, a gain intersecting point satisfies the following condition: f1<gain intersecting point<f2.

According to the structure described above, the shake can be corrected without being affected by mechanical natural (specific) resonance frequency determined by elasticity and mass and by detuning, frequency of the gyroscope. In order to correct a shake, it is preferable that a stable servo gain over a wide band width is provided so as to sufficiently cancel displacement speed of 1-15 Hz (from 1 Hz to 15 Hz) which is an object to be corrected of a shake such as a hand shake. However, when the servo band width is set to be too much wider, correction is affected by the mechanical natural resonance frequency determined by elasticity and mass and by detuning frequency of the gyroscope. In other words, a vibrator of a gyroscope has a natural (specific) resonance frequency, which is commonly a higher value of several tens of kHz in order to enhance detection sensitivity of the Coriolis force. However, a detuning frequency which is a difference between the excitation side resonance frequency and the detection side resonance frequency becomes a value of the same order as the resonance frequency of the spring system. In order to realize a sufficient vibration-damping property, it is preferable to secure a necessary gain to a resonance point of the spring system to provide an active dumping restraint but, when the detuning frequency of the gyroscope is located in the servo band width, the servo system becomes unstable. However, according to an embodiment of the present invention, the frequency "f1" of the control signal, the resonance frequency "f2" of the spring member, the detuning frequency "f3" of the gyroscope, and the gain intersecting point satisfy the above-mentioned conditions and thus the shake can be corrected without being affected by mechanical natural resonance frequency determined by the elasticity and the mass and the detuning frequency of the gyroscope.

In accordance with an embodiment of the present invention, the control section obtains a quantity of angular displacement of the movable module on the basis of an angular velocity signal outputted from the gyroscope to control the drive mechanism for shake correction for cancelling the angular displacement.

In accordance with an embodiment of the present invention, the control section is structured in an integrated circuit which is mounted on a flexible circuit board drawn from the movable module.

In accordance with an embodiment of the present invention, the control section is accommodated in a package in which the gyroscope is accommodated.

In accordance with an embodiment of the present invention, a control of the control section is started on the basis of a command signal from the outside.

In accordance with an embodiment of the present invention, a control of the control section is executed during having been photographed by the imaging element through the lens.

In accordance with an embodiment of the present invention, the optical element is a lens, and an imaging element is mounted on a rear side with respect to the lens in the movable module.

In accordance with an embodiment of the present invention, a control of the control section is executed at a time of an operation of a photographing start switch.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 2(a) and 2(b) are explanatory views showing a lens drive module which is structured within a movable module of an optical unit with shake correcting function in accordance with an embodiment of the present invention.

FIG. 3 is an explanatory view schematically showing an operation of the lens drive module shown in FIGS. 2(a) and 2(b).

DETAILED DESCRIPTION OF THE PREFERRED EMBODIMENTS

Figure 1A:
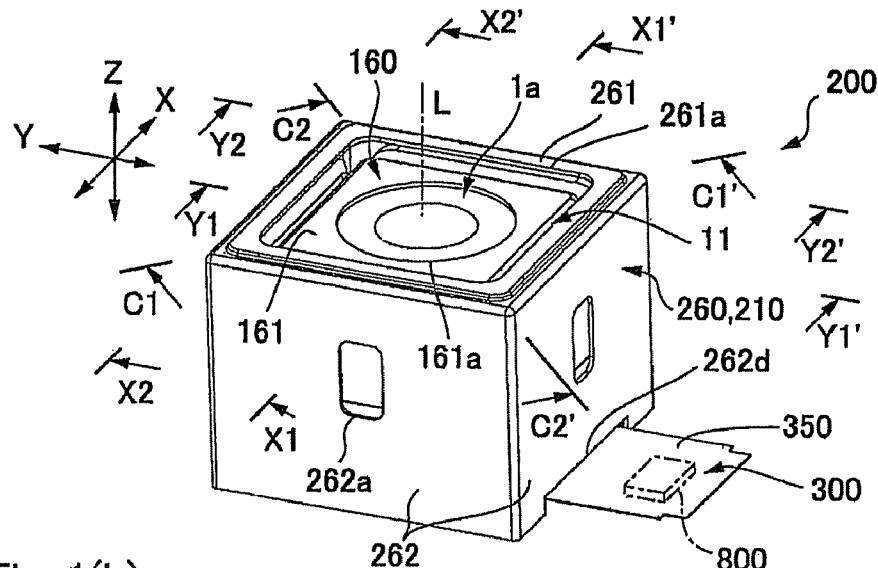
FIGS. 1(a), 1(b) and 1(c) are explanatory views showing an entire optical unit with shake correcting function in accordance with an embodiment of the present invention.

An embodiment of the present invention will be described below with reference to the accompanying drawings. In the following description, three directions perpendicular to each other, i.e., an X-axis, a Y-axis and a Z-axis are set in a fixed body, and the direction along an optical axis "L" (lens optical axis) is set to be the Z-axis. Therefore, in the following description, swing around the X-axis corresponds to a so-called pitching (vertical swing), swing around the Y-axis corresponds to a so-called yawing (lateral swing) and swing around the Z-axis corresponds to a so-called rolling. Further, in the following description, "object to be photographed side" is described as "front side" or "upper side", and "opposite side to the object to be photographed side" is described as "rear side" or "lower side".

FIGS. 1(*a*), 1(*b*) and 1(*c*) are explanatory views showing an entire optical unit with shake correcting function in accordance with an embodiment of the present invention. FIG. 1(*a*) is a perspective view showing an optical unit with shake correcting function in accordance with an embodiment of the present invention which is viewed from an object to be photographed side (front side), FIG. 1(*b*) is a perspective view showing the optical unit viewed from the rear side which is an opposite side to the object to be photographed side, and FIG. 1(*c*) is an explanatory view showing a state where the optical unit with shake correcting function is mounted on an optical apparatus such as a cell phone.

An optical unit 200 with shake correcting function (for example, shake by hand) shown in FIGS. 1(*a*) and 1(*b*) is a thin type camera which is used in a cell phone with a camera. The optical unit 200 as a whole is provided with a substantially rectangular parallelepiped shape. In this embodiment, the optical unit 200 with shake correcting function includes a base 220 in a roughly rectangular plate shape and a box-shaped fixed cover 260 which is covered on an upper side of the base 220. The base 220 and the fixed cover 260 are fixed to each other to structure a part of the fixed body 210. A front side end part of the fixed body 210 (object side end part) may be mounted with an attached module which includes a shutter mechanism, a filter drive mechanism by which various filters are switched to a position on an optical axis or to a position retracted from the optical axis, and a diaphragm mechanism.

The fixed cover 260 is formed in a rectangular shape when viewed from a direction of the optical axis "L" (direction of Z-axis) and the fixed cover 260 is provided with a rectangular top plate part 261 on its front side. The top plate part 261 is formed with a rectangular opening part 261*a* and four side plate parts 262 are extended from an outer circumferential edge of the top plate part 261 toward the rear side. Rear end edges of two side plate parts 262 located in the Y-axis direction are formed with a cut-out part 262*d* and a lead-out part 350 of the flexible circuit board 300 is drawn in the Y-axis direction from one of two side plate parts 262 located in the Y-axis direction through the cut-out part 262*d*. The lead-out part 350 of the flexible circuit board 300 is fixed to the side plate part 262 with an adhesive.

An inside of the fixed cover 260 is disposed with a movable module 1 which accommodates a focus mechanism for a lens and, as described below, a shake correction mechanism which swings the movable module 1 to perform shake correction, especially by hand shake, is structured in the inside of the fixed cover 260. The movable module 1 includes a lens drive module 1*a* accommodating the focus mechanism for a lens in its inside and the lens drive module 1*a* is held in the inside of a rectangular tube-shaped module cover 160.

FIGS. 2(*a*) and 2(*b*) are explanatory views showing the lens drive module 1*a* which is structured in the movable module 1 of the optical unit 200 with a shake correcting function in accordance with an embodiment of the present invention. FIG. 2(*a*) is an outward appearance view showing the lens drive module 1*a* which is viewed from obliquely above and FIG. 2(*b*) is its exploded perspective view. FIG. 3 is an explanatory view schematically showing an operation of the lens drive module 1*a* shown in FIGS. 2(*a*) and 2(*b*). The left half portion in FIG. 3 shows a state where the movable body 3 is located at an infinity position (normal photographing position) and the right half portion in FIG. 3 shows a state where the movable body 3 is located at a macro-position (close-up photographing position).

In FIGS. 2(*a*) and 2(*b*) and FIG. 3, the lens drive module 1*a* moves a lens along the direction of the optical axis "L" in both of an "A"-direction (front side) toward an object to be photographed side (object side) and a "B"-direction (rear side) toward an opposite side to the object to be photographed side (imaging element side/image side). The lens drive module 1*a* is formed in a substantially rectangular parallelepiped shape. The lens drive module 1*a* generally includes the movable body 3, which holds three lenses 121 and a fixed diaphragm in its inside, a lens drive mechanism 5 for moving the movable body 3 along the direction of the optical axis "L", and a support body 2 on which the lens drive mechanism 5, the movable body 3 and the like are mounted. The movable body 3 includes a lens holder 12 in a cylindrical shape which holds the lenses 121 and the fixed diaphragm and a lens drive coil holder 13 which holds lens drive coils 30*s* and 30*t* described below on its outer peripheral side face.

The support body 2 includes an imaging element holder 19 in a rectangular plate shape which holds an imaging element 15 in a positioned state on an opposite side to the object to be photographed side, a box-shaped case 18 which is disposed on the object to be photographed side as a cover to the imaging element holder 19, and a spacer 11 in a rectangular plate shape which is disposed in the inside of the case 18. Centers of the case 18 and the spacer 11 are respectively formed with circular incident windows 110 and 18*a* for introducing a light from the object to be photographed into the lenses 121. Further, a center of the imaging element holder 19 is formed with an opening 19*a* for introducing the incident light into the imaging element 15.

In the lens drive module 1*a*, the support body 2 includes a circuit board 154 on which the imaging element 15 is mounted and the circuit board 154 is fixed to the under face of the imaging element holder 19. The circuit board 154 is a double-side circuit board and the flexible circuit board 300 shown in FIGS. 1(*a*), 1(*b*) and 1(*c*) is connected with the under face of the circuit board 154.

In this embodiment, the case 18 is made of a ferromagnetic plate such as a steel plate and functions as a yoke. Therefore, the case 18 structures an interlinkage magnetic field generating body 4 together with lens drive magnets 17 described below for generating interlinkage magnetic field in lens drive coils 30*s* and 30*t* which are held by a lens drive coil holder 13. The interlinkage magnetic field generating body 4 structures the lens drive mechanism 5 together with the lens drive coils 30s and 30t which are wound around the outer peripheral face of the lens drive coil holder 13.

The support body 2 and the movable body 3 are connected with each other through metal spring members 14s and 14t. Basic structures of the spring members 14s and 14t are similar to each other. Each of the spring members 14s and 14t is provided with an outer peripheral side connecting part 14a which is held by the support body 2, a ring-shaped inner peripheral side connecting part 14b which is held by the movable body 3, and an arm-shaped flat spring part 14c which connects the outer peripheral side connecting part 14a with the inner peripheral side connecting part 14b. The outer peripheral side connecting part 14a of the spring member 14s on the imaging element side is held by the imaging element holder 19 and its inner peripheral side connecting part 14b is connected with an imaging element side end face of the lens drive coil holder 13 of the movable body 3. The outer peripheral side connecting part 14a of the spring member 14t on the object to be photographed side is held by the spacer 11, and its inner peripheral side connecting part 14b is connected with an object to be photographed side end face of the lens drive coil holder 13 of the movable body 3. In this manner, the movable body 3 is movably supported along the direction of the optical axis "L" by the support body 2 through the spring members 14s and 14t. Each of the spring members 14s and 14t is made of nonmagnetic metal such as beryllium copper or nonmagnetic SUS steel material and is formed by means of that a thin plate having a predetermined thickness is performed by press working or etching processing with the use of photo lithography technique. The spring member 14s is divided into two spring pieces 14e and 14f and coil ends of the lens drive coils 30s and 30t are respectively connected with the spring pieces 14e and 14f. Further, the spring pieces 14e and 14f of the spring member 14s are respectively formed with terminals 14d, and the spring member 14s (spring pieces 14e and 14f) functions as a power supply member to the lens drive coils 30s and 30t.

In this embodiment, a ring-shaped magnetic piece 61 is held on the front side end face of the lens drive coil holder 13 and the magnetic piece 61 is located at a front side position with respect to the lens drive magnets 17. The magnetic piece 61 applies an urging force in the direction of the optical axis "L" to the movable body 3 by an attraction force generated between the lens drive magnets 17 and the magnetic piece 61. Therefore, the movable body 3 is prevented from being displaced by its own weight at the time of no energization and thus the movable body 3 is maintained in a desired posture and its impact resistance is improved. Further, since the magnetic piece 61 is disposed on the front side end face of the lens holder 12, at the time of no energization (home position), the lens holder 12 is placed in a stationary state on the rear side by means of that the magnetic piece 61 is attracted by the lens drive magnets 17.

In the lens drive module 1a in this embodiment, when viewed from the direction of the optical axis "L", the lens 121 is formed in a circular shape but the case 18 used for the support body 2 is formed in a rectangular box shape. Therefore, the case 18 is provided with a rectangular tube-shaped body part 18c and an upper plate part 18g having an incident window 18a which is formed on an upper face side of the rectangular tube-shaped body part 18c. In this embodiment, the rectangular tube-shaped body part 18c is formed in a square tube shape and provided with four side plate parts 18b at respective positions corresponding to sides of a quadrangle when viewed from the direction of the optical axis "L". Respective inner faces of four side plate parts 18b are fixed with the lens drive magnets 17 and each of the lens drive magnets 17 is formed of a rectangular flat plate-shaped permanent magnet. Each of four lens drive magnets 17 is magnetically divided into two pieces in the direction of the optical axis "L" and each of the pieces is magnetized so that its inner face and outer face are magnetized in different poles from each other. In four lens drive magnets 17, for example, an inner face of an upper half portion is magnetized in "N"-pole and its outer face is magnetized in "S"-pole, and an inner face of a lower half portion is magnetized in "S"-pole and its outer face is magnetized in "N"-pole. Therefore, in four lens drive magnets 17, arrangement of the magnetic poles of adjacent permanent magnets is the same as each other and thus interlinkage flux lines to the coils are generated efficiently.

The movable body 3 includes the lens holder 12 in a cylindrical shape, which holds the lenses 121 and the like, and the lens drive coil holder 13 in which the coil (lens drive coils 30s and 30t) are wound around its outer peripheral side face. A side wall portion of the movable body 3 is structured by the lens holder 12 and the lens drive coil holder 13. The lens holder 12 is structured so that its upper half portion is formed in a large diameter cylindrical part 12b having a larger diameter and its lower half portion is formed in a small diameter cylindrical part 12a having a smaller diameter than the large diameter cylindrical part 12b. The lens drive coil holder 13 is provided with a circular lens holder accommodating opening 130 for holding the lens holder 12 in its inside.

In this embodiment, an inner circumferential shape of the lens drive coil holder 13 is circular when viewed from the direction of the optical axis "L" but its outer peripheral side face 131 which defines the outer peripheral shape of the lens drive coil holder 13 is rectangular and thus four faces 132 are provided at respective positions corresponding to four sides of the quadrangle. In the outer peripheral side face 131 of the lens drive coil holder 13, rib-shaped protruded parts 131a, 131b and 131c are formed at both end parts and a middle position in the direction of the optical axis "L" over the whole circumference. A recessed part between the rib-shaped protruded part 131a which is formed at the imaging element side end part and the rib-shaped protruded part 131b formed at the middle position is a first coil winding part 132a, and a recessed part between the rib-shaped protruded part 131c which is formed at the object side end part and the rib-shaped protruded part 131b formed at the middle position is a second coil winding part 132b.

Each of four faces 132 of the lens drive coil holder 13 is formed with a rectangular through hole (through holes 133a and 133b) so that the first coil winding part 132a and the second coil winding part 132b are respectively removed so as to avoid the corner portion of the quadrangle. The through holes 133a and 133b are penetrated through the side wall face of the lens drive coil holder 13 in an inside and outside direction. In this manner, in this embodiment, hollow portions which are recessed toward inside are structured in the outer peripheral side face 131 of the movable body 3 by the through holes 133a and 133b of the lens drive coil holder 13. The through holes 133a and 133b are formed at center portions in the circumferential direction between adjacent corner portions in the outer peripheral side face 131 of the lens drive coil holder 13. Lengths of the through holes 133a and 133b in the circumferential direction are set to be about ⅓ dimension of lengths of the respective faces 132 (side dimension of the quadrangle). Therefore, the corner portions of the lens drive coil holder 13 are formed with support portions 134 having a larger wall thickness which are extended with a similar thickness toward the direction of the optical axis "L".

In the lens drive coil holder 13 which is structured as described above, the lens drive coil 30s is wound around the first coil winding part 132a and the lens drive coil 30t is wound around the second coil winding part 132b. In this embodiment, the first coil winding part 132a and the second coil winding part 132b are formed in a rectangular shape when viewed from the direction of the optical axis "L" and thus the lens drive coils 30s and 30t are wound around in a rectangular tube shape. As described above, each of four lens drive magnets 17 is magnetically divided into two pieces in the direction of the optical axis "L" and each of the pieces is magnetized so that its inner face and outer face are magnetized in different poles from each other. Therefore, winding directions of two lens drive coils 30s and 30t are opposite to each other.

The lens drive coil holder 13 which is structured as described above is disposed in the inside of the case 18. As a result, four side parts of the lens drive coils 30s and 30t are respectively faced with the lens drive magnets 17 which are fixed to the inner face of the rectangular tube-shaped body part 18c of the case 18.

In the lens drive module 1a in this embodiment, the movable body 3 is normally located on the imaging element side (rear side) and, in this state, when an electric current is supplied to the lens drive coils 30s and 30t in a predetermined direction, the lens drive coils 30s and 30t are respectively received with an upward (front side) electro-magnetic force. Therefore, the movable body 3 to which the lens drive coils 30s and 30t are fixed begins to move toward the object to be photographed side (front side). On the other hand, elastic forces which restrict movement of the movable body 3 are occurred between the spring member 14t and the front end of the movable body 3 and between the spring member 14s and the rear end of the movable body 3. Therefore, the movable body 3 is stopped when the electro-magnetic force moving the movable body 3 toward the front side and the elastic forces restricting movement of the movable body 3 are balanced with each other. In this case, when an amount of the electric current supplied to the lens drive coils 30s and 30t is adjusted according to the elastic forces acting on the movable body 3 by the spring members 14s and 14t, the movable body 3 can be stopped at a desired position.

Further, in the lens drive module 1a, the lens 121 is circular but the lens drive coils 30s and 30t are rectangular regardless of the lens shape, and the lens drive magnets 17 are flat plate-shaped permanent magnets which are respectively fixed to a plurality of inner faces corresponding to sides of the rectangular tube-shaped body part 18c of the case 18 in the support body 2 whose inner peripheral faces are formed in a rectangular shape. Therefore, even when there is no sufficient space between the movable body 3 and the support body 2 on the outer peripheral side of the movable body 3, facing area of the lens drive coils 30s and 30t with the lens drive magnets 17 is larger and thus a sufficient thrust force is obtained.

In the lens drive module 1a which is structured as described above, the imaging element 15 and the lens drive coils 30s and 30t are required to be electrically connected with a control section (not shown) of a device main body. Therefore, in this embodiment, the flexible circuit board 300 (see FIGS. 1(a), 1(b) and 1(c)) is disposed on an opposite side to the object to be photographed side with respect to the lens drive module 1a, and the imaging element 15 and the lens drive coils 30s and 30t are electrically connected with wiring patterns which are formed on the flexible circuit board 300.

Figure 1B:
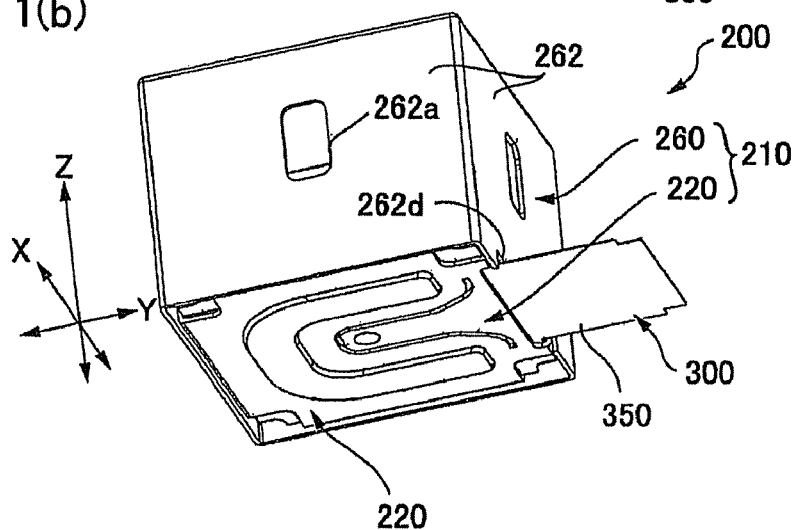
Figure 1C:
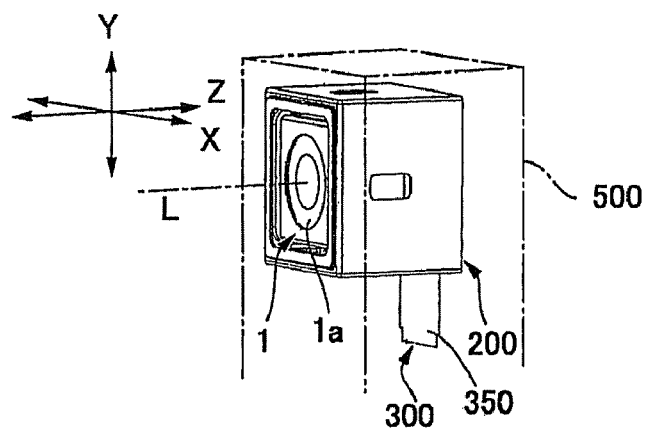

As shown in FIG. 1(c), the optical unit 200 with shake correcting function in this embodiment is mounted on an apparatus 500 such as a cell phone and used to photograph.

When an object is to be photographed in the apparatus 500, the Z-axis is generally directed horizontally. Therefore, a longitudinal shake around the X-axis and a lateral shake around the Y-axis may occur due to shake of hand when a shutter is pushed. Therefore, in this embodiment, a shake correction function is provided which will be described below with reference to FIG. 4(a) through FIG. 14(c). In the shake correction mechanism, a shake detection sensor is provided in the movable module 1 and it is structured that the movable module 1 which is disposed to be capable of swinging around the X-axis and the Y-axis with respect to the fixed body 210 is swung by a magnetic drive mechanism for shake correction.

Detailed structure of a shake correction mechanism which is structured in the optical unit 200 with shake correcting function in this embodiment will be described below in the following order:

Entire structure of the optical unit 200 with shake correcting function . . . FIG. 4(a) through FIG. 7

Detailed structure of the movable module 1 . . . FIG. 4(a) through FIG. 10

Structure of a support mechanism for the movable module 1 . . . FIG. 4(a) through FIG. 5(b) and FIG. 11(a) through FIG. 12(b)

Structure of a moving range restriction mechanism for the movable module 1 . . . Fig. (a) through FIG. 14(c)

Figure 4A:
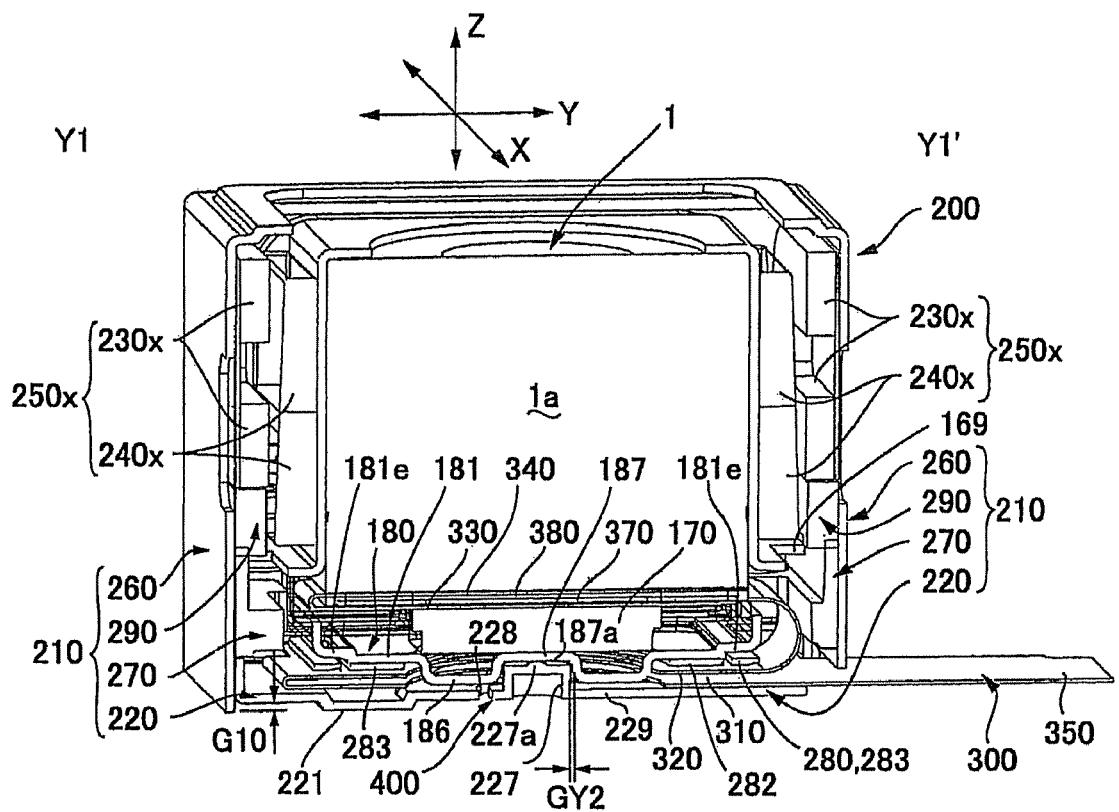
FIGS. 4(a) and 4(b) are explanatory cross sectional views showing a structure of an optical unit with shake correcting function in accordance with an embodiment of the present invention.
Figure 4B:
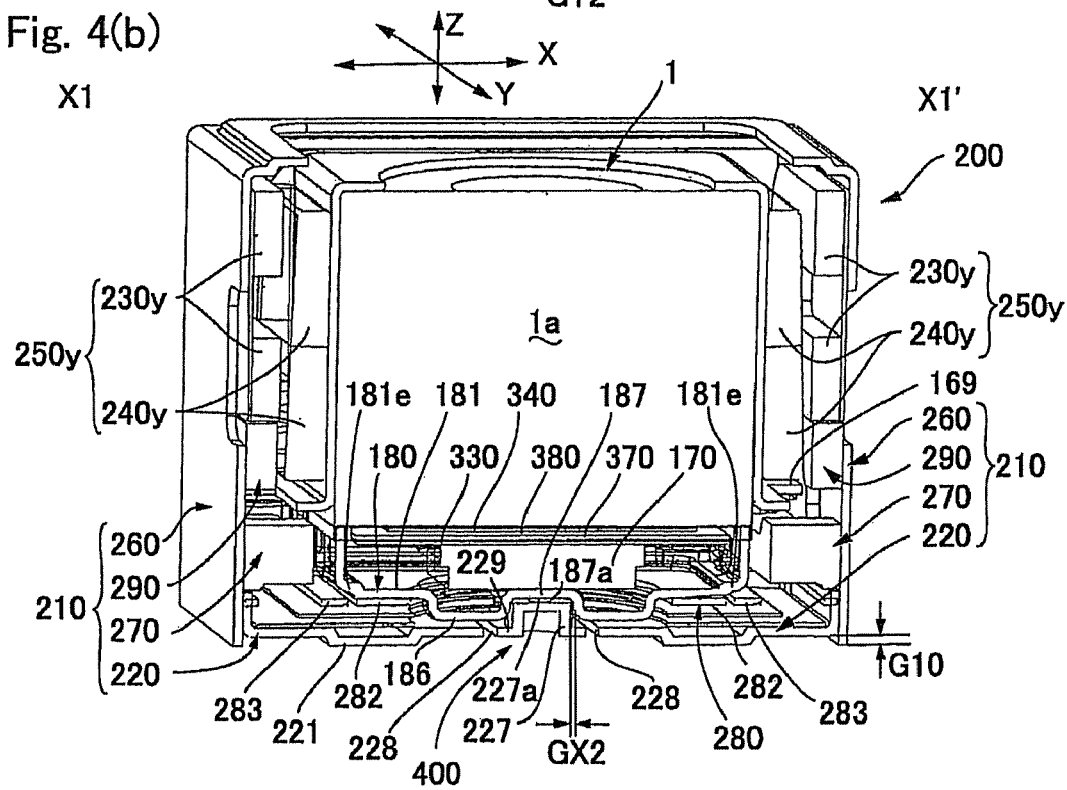
Figure 5A:
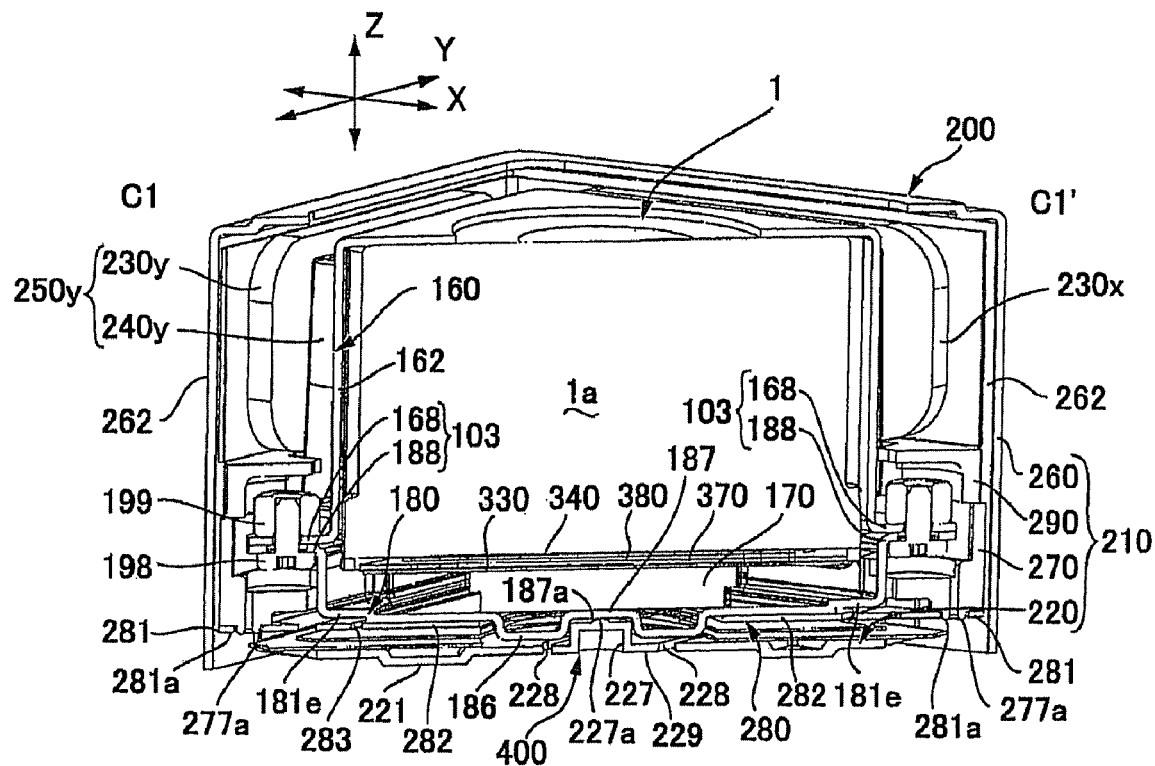
FIGS. 5(a) and 5(b) are explanatory cross sectional views showing the structure of an optical unit with shake correcting function in accordance with an embodiment of the present invention which are cut at positions different from FIGS. 4(a) and 4(b).
Figure 5B:
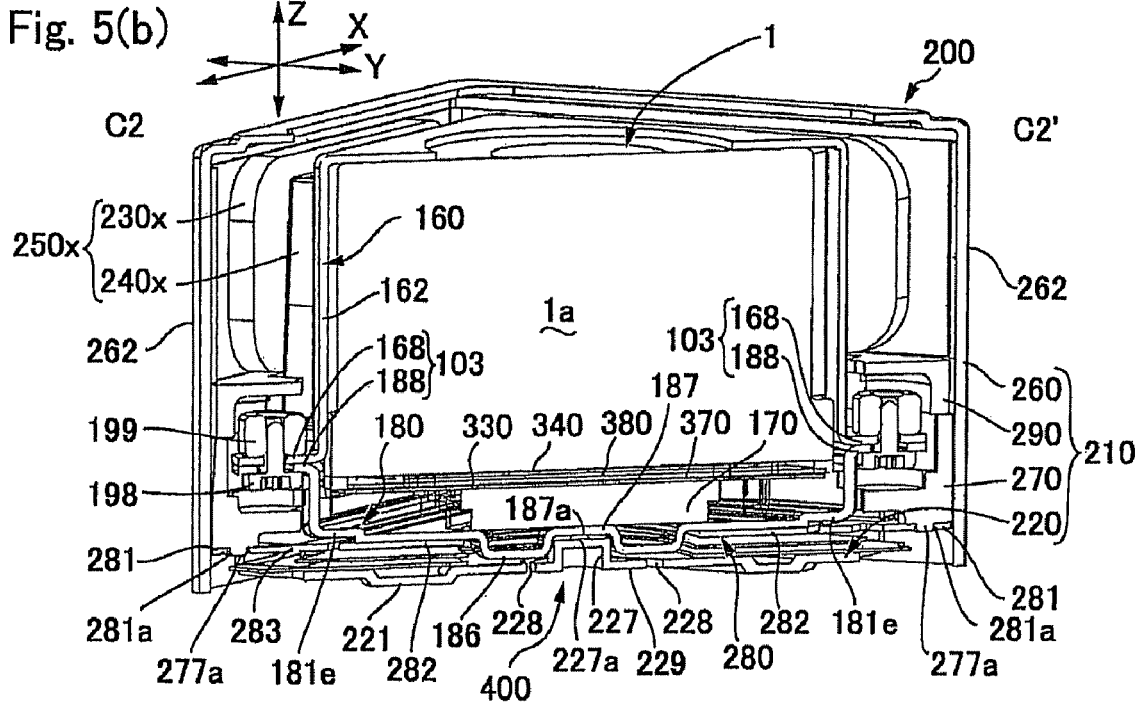
Figure 6:
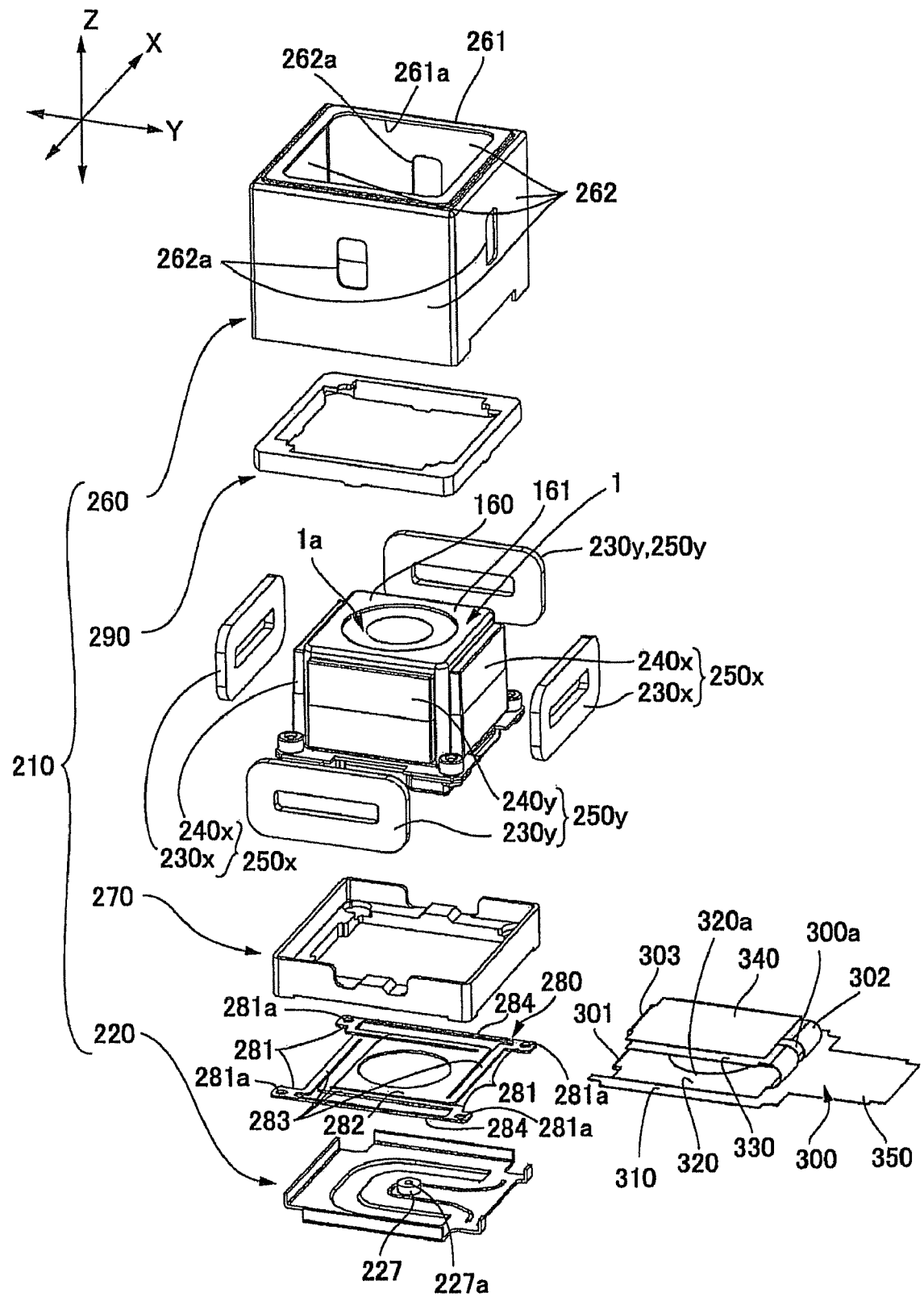
FIG. 6 is an exploded perspective view showing an optical unit with shake correcting function in accordance with an embodiment of the present invention which is viewed from a front side.
Figure 7:
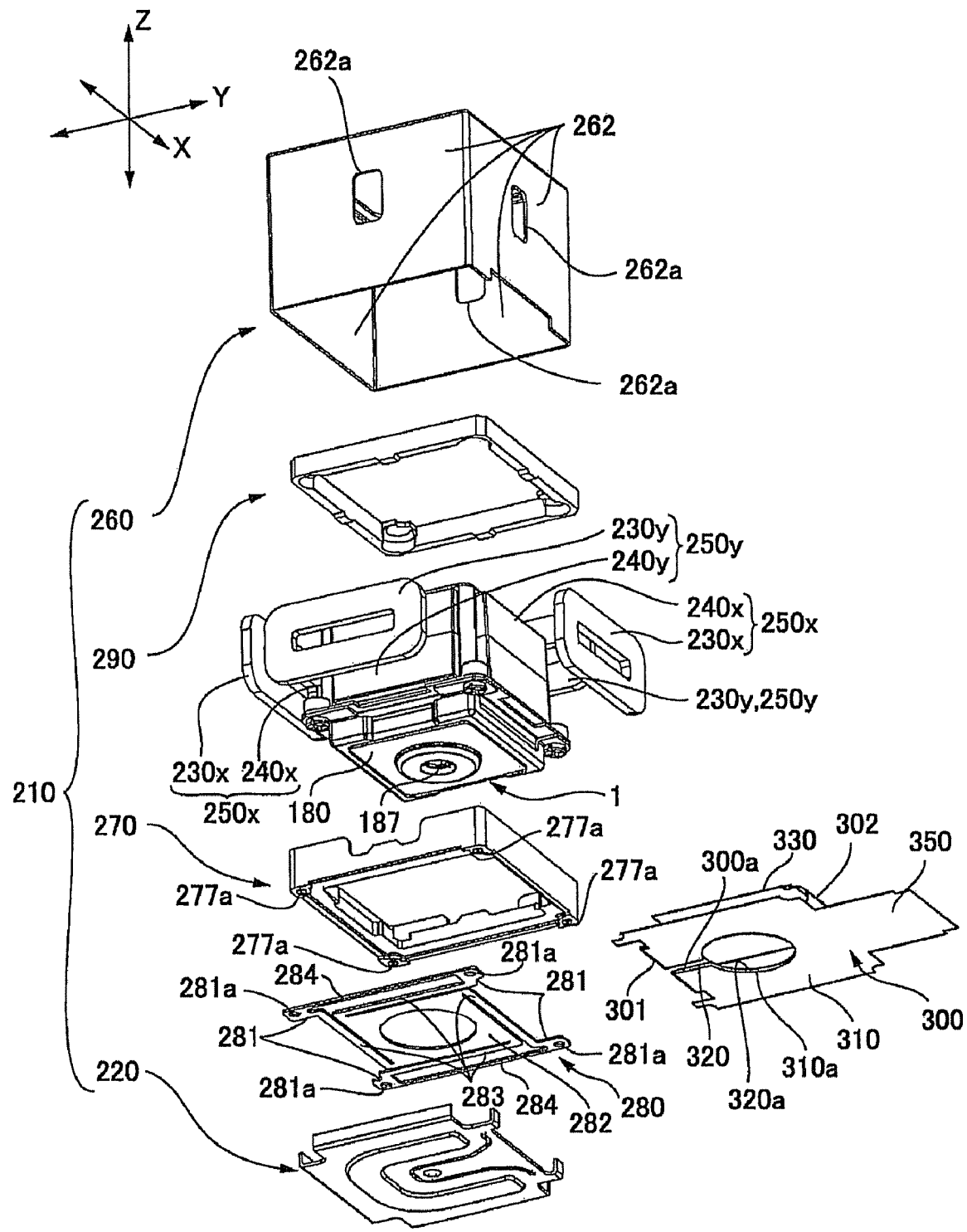
FIG. 7 is an exploded perspective view showing an optical unit with shake correcting function in accordance with an embodiment of the present invention which is viewed from a rear side.
Figure 8A:
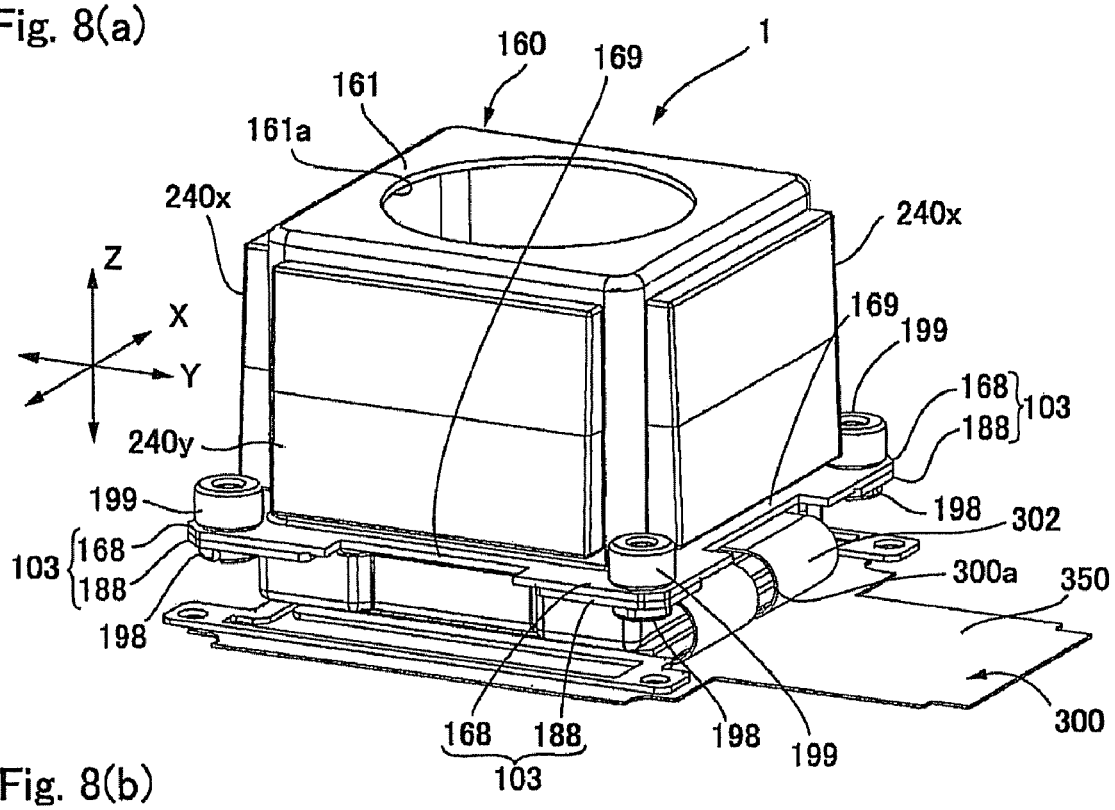
FIGS. 8(a) and 8(b) are explanatory views showing a movable module and structural members connected to the movable module of an optical unit with shake correcting function in accordance with an embodiment of the present invention.
Figure 8B:
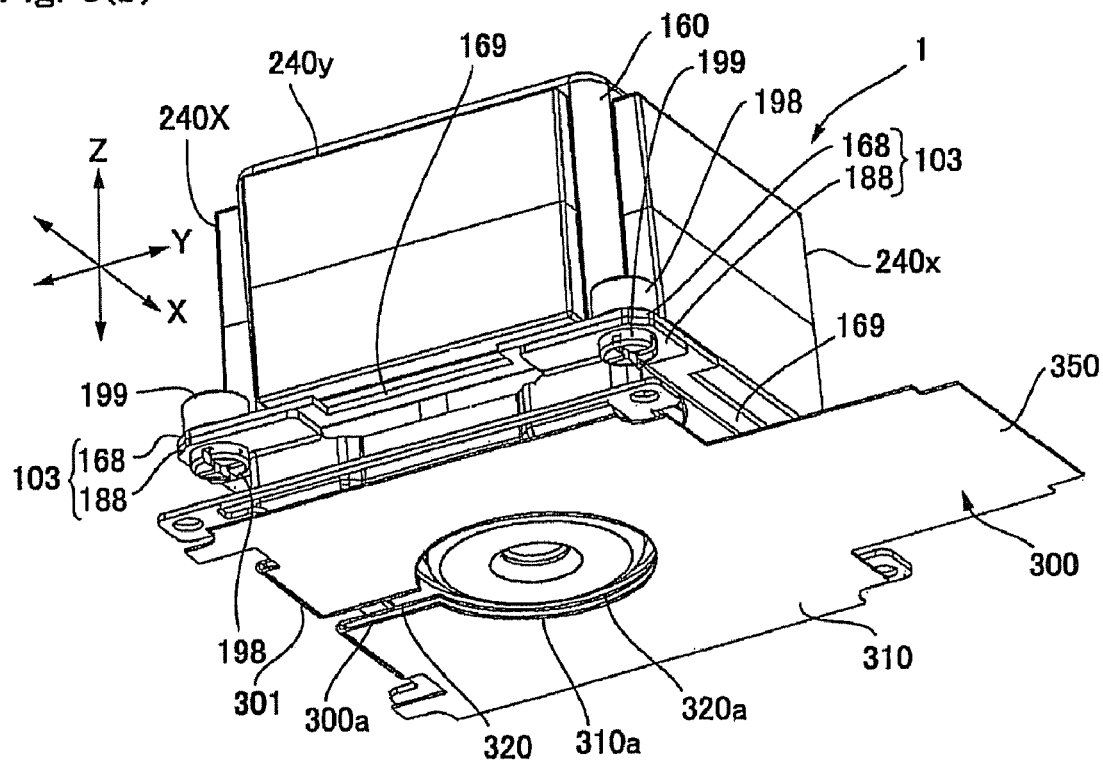

FIGS. 4(a) and 4(b) are explanatory cross sectional views showing a structure of the optical unit 200 with shake correcting function to which the present invention is applied. FIG. 4(a) is a longitudinal cross sectional view showing the optical unit 200 with shake correcting function which is cut at a position corresponding to "Y1-Y1'" line in FIG. 1(a) and FIG. 4(b) is a longitudinal cross sectional view showing the optical unit 200 which is cut at a position corresponding to "X1-X1'" line in FIG. 1(a). FIGS. 5(a) and 5(b) are explanatory cross sectional views showing the structure of the optical unit 200 with shake correcting function to which the present invention is applied and which are cut at different positions from FIGS. 4(a) and 4(b). FIG. 5(a) is a longitudinal cross sectional view showing the optical unit 200 with shake correcting function which is cut at a position corresponding to "C1-C1'" line in FIG. 1(a) and FIG. 5(b) is a longitudinal cross sectional view showing the optical unit 200 which is cut at a position corresponding to "C2-C2'" line in FIG. 1(a). FIG. 6 is an exploded perspective view showing the optical unit 200 with shake correcting function to which the present invention is applied and which is viewed from the front side and FIG. 7 is its exploded perspective view which is viewed from the rear side. FIGS. 8(a) and 8(b) are explanatory views showing the movable module 1 of the optical unit 200 with shake correcting function to which the present invention is applied and a member connected with the movable module 1. FIG. 8(a) is a perspective view showing the movable module 1 and a structural member connected with the movable module 1 which are viewed from the front side and FIG. 8(b) is its perspective view which is viewed from the rear side.

As shown in FIG. 4(a) through FIG. 7, in this embodiment, the fixed body 210 is structured so that a base 220, a rear side stopper member 270, a front side stopper member 290 and a fixed cover 260 are sequentially superposed on each other from the rear side (lower side) to the front side (upper side). The base 220 supports the movable module 1 to be capable of swinging. The rear side stopper member 270 and the front side stopper member 290 function to prevent an excessive displacement of the movable module 1 which is supported to be capable of swinging. The fixed cover 260 functions as a housing of the optical unit 200 with shake correcting function and functions to hold the magnets 240x and 240y for shake correction.

The flexible circuit board 300 and a spring member 280 (urging member) shown in FIGS. 4(a) and 4(b) and FIGS. 8(a) and 8(b) are disposed between the base 220 and the movable module 1. The flexible circuit board 300 and the spring member 280 are connected with the movable module 1. The flexible circuit board 300 performs function to electrically connect a shake detection sensor 170 and a coil used in a magnetic drive mechanism for shake correction with the outside. The spring member 280 functions to urge the movable module 1 toward the base 220.

Figure 9:
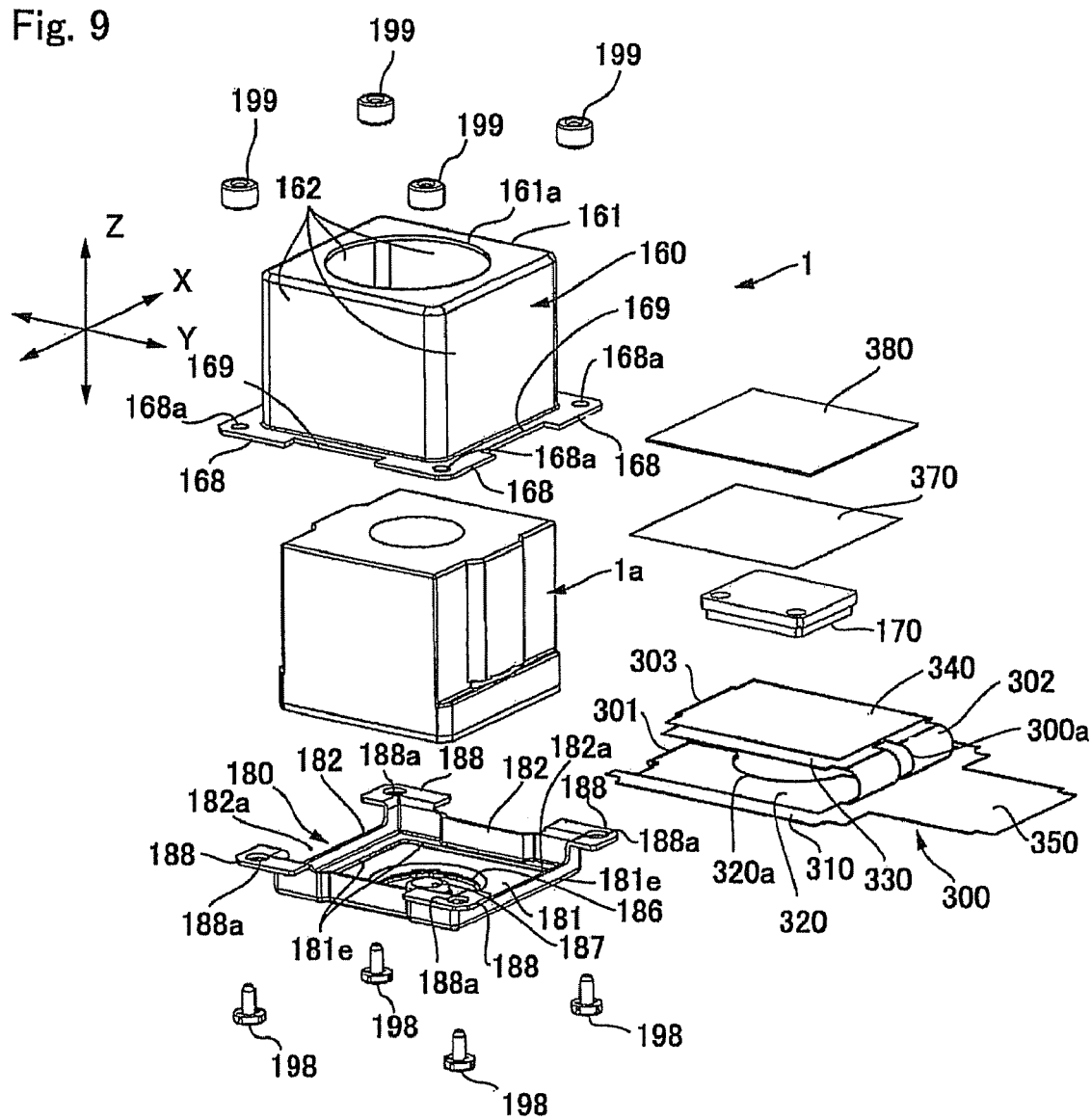
FIG. 9 is an exploded perspective view showing a movable module and a flexible circuit board used in an optical unit with shake correcting function in accordance with an embodiment of the present invention which are viewed from a front side.
Figure 10:
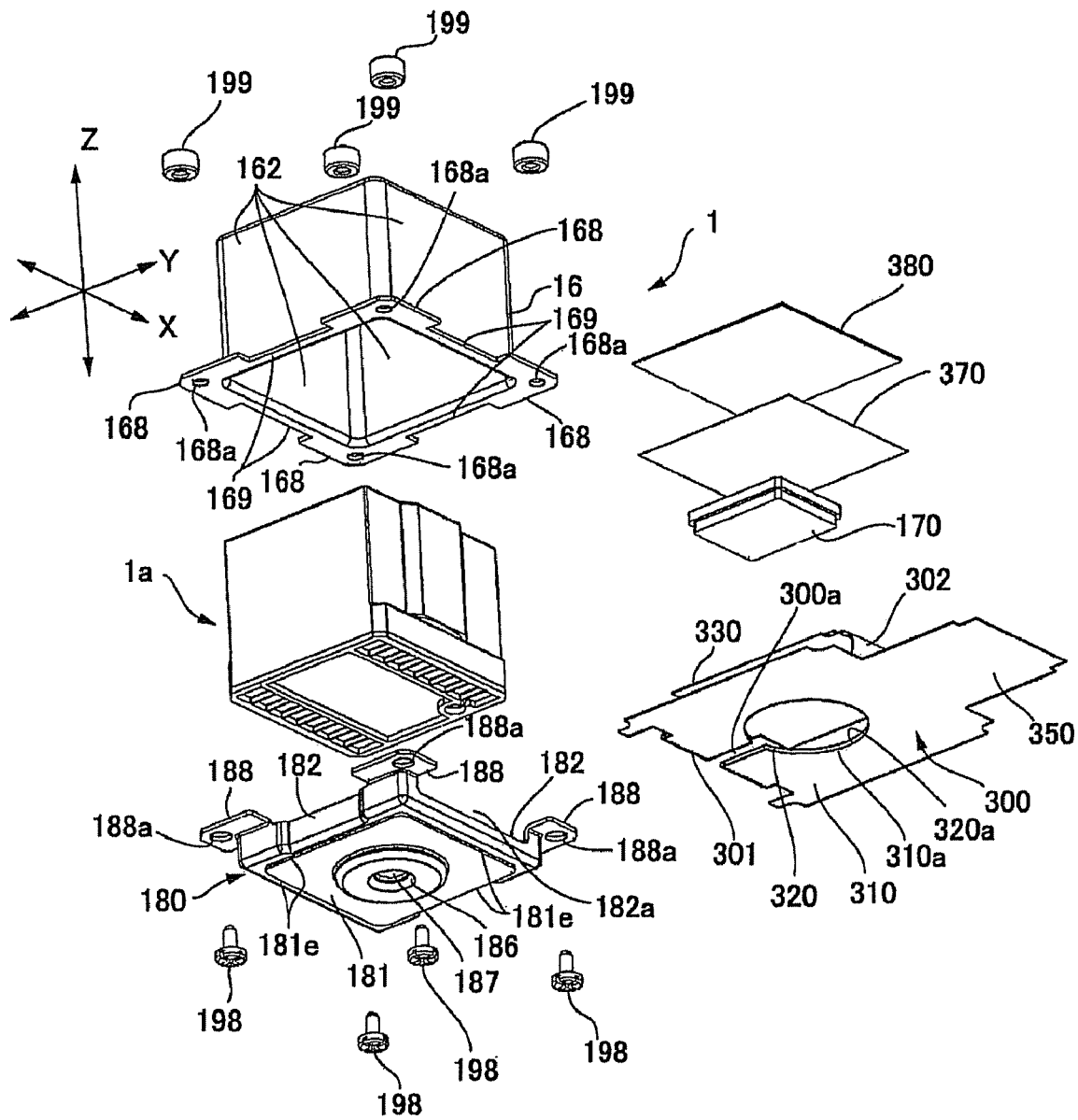
FIG. 10 is an exploded perspective view showing a movable module and a flexible circuit board used in an optical unit with shake correcting function in accordance with an embodiment of the present invention which are viewed from a rear side.

FIG. 9 is an exploded perspective view showing the movable module 1, which is used in the optical unit 200 with shake correcting function to which the present invention is applied, and the flexible circuit board 300, which are viewed from the front side, and FIG. 10 is their exploded perspective view which is viewed from the rear side.

As shown in FIG. 4(a) through FIG. 10, the movable module 1 includes a module cover 160 which holds the lens drive module 1a in its inside. The module cover 160 is provided with a rectangular shape when viewed in the Z-axis direction and four side plate parts 162 are extended from an outer circumferential edge of a top plate part 161 formed in a rectangular shape toward the rear side. The top plate part 161 of the module cover 160 is formed with a circular opening part 161a.

A rear end part of the module cover 160 is opened as an aperture and a metal sensor cover 180 is connected with the rear end part of the module cover 160 so as to cover the aperture. In order to attain this connection, in this embodiment, the rear end part of the module cover 160 is formed with a bent part 169 which is protruded to an outer side. The bent part 169 is provided at four corner portions with module cover side flange parts 168 which are largely projected toward the outer side in a plane intersecting the Z-axis (in this embodiment, in a plane perpendicular to the Z-axis).

The sensor cover 180 is provided with a bottom plate part 181 and four side plate parts 182 which are stood up toward the front side from an outer circumferential edge of the bottom plate part 181. Each of four corner portions at front end edges of the side plate parts 182 is formed with a sensor cover side flange part 188 which is projected toward an outer side in a plane intersecting the Z-axis (in this embodiment, in a plane perpendicular to the Z-axis).

The sensor cover side flange part 188 and the module cover side flange part 168 are formed to superpose on each other in the Z-axis direction. Further, the sensor cover side flange part 188 and the module cover side flange part 168 are formed with small openings 188a and 168a. Therefore, in this embodiment, in a state that shaft parts of screws 198 are penetrated through the small openings 188a and 168a, the shaft parts are fitted to tube-shaped members 199 whose inner peripheral faces are formed with a female screw. When the sensor cover 180 and the module cover 160 are connected with each other as described above, as shown in FIG. 4(a) through FIG. 8(b), the outer peripheral face of the movable module 1 is formed with protruded parts 103 so as to project toward the outer side by the module cover side flange part 168 and the sensor cover side flange part 188 at four corner portions of the movable module.

The side plate parts 182 facing in the Y-axis direction of the sensor cover 180 are formed with a cut-out part 182a at their front end edges. Therefore, in the state that the sensor cover 180 and the module cover 160 are connected with each other, gap spaces which are opened in the Y-axis direction are formed between the sensor cover 180 and the module cover 160. Therefore, a part of the flexible circuit board 300 is disposed between the sensor cover 180 and the lens drive module 1a and the lead-out part 350 of the flexible circuit board 300 is extended from the movable module 1 toward one side in the Y-axis direction.

The flexible circuit board 300 is formed in a folded shape where a sheet in a roughly rectangular shape which is extended in the Y-axis direction is bent at three portions in its longitudinal direction (bent portions 301, 302 and 303). Therefore, the flexible circuit board 300 is provided with a lead-out portion 350 extended to the outside, a first flat plate portion 310 which is connected with the lead-out portion 350, a second flat plate portion 320 which is connected with the first flat plate portion 310 through the bent portion 301, a third flat plate portion 330 which is connected with the second flat plate portion 320 through the bent portion 302, and a fourth flat plate portion 340 which is connected with the third flat plate portion 330 through the bent portion 303. The first flat plate portion 310, the second flat plate portion 320, the third flat plate portion 330 and the fourth flat plate portion 340 are disposed in a shape sequentially folded from the rear side to the front side in the Z-axis direction. In this embodiment, the bent portions 301 and 303 are bent at an acute angle but the bent portion 302 is circularly curved in a "U"-shape.

In the flexible circuit board 300, the first flat plate portion 310 and the second flat plate portion 320 are disposed on the rear side (lower side) of the sensor cover 180 and the third flat plate portion 330 and the fourth flat plate portion 340 are disposed between the sensor cover 180 and the lens drive module 1a. Therefore, one side of the flexible circuit board 300 with respect to the bent portion 302 is disposed and extended in the inside of the movable module 1, and the other side of the flexible circuit board 300 with respect to the bent portion 302 is extended from the movable module 1 to the outside.

In the flexible circuit board 300, the shake detection sensor 170 is mounted on an under face of the third flat plate portion 330 and an under face of the shake detection sensor 170 is adhesively fixed to the sensor cover 180. The portion of the flexible circuit board 300 which is disposed within the inside of the movable module 1 is displaced with the movable module 1 in an integral manner, and the portion of the flexible circuit board 300 which is extended to the outside from the movable module 1 and is located near the movable module 1 is deformed according to swing operation of the movable module 1.

An upper face of the third flat plate portion 330 is fixed with a metal plate 380 for reinforcement through a flexible double-side tape 370. In this state, the under face side of the shake detection sensor 170 is shielded by the sensor cover 180 and the upper face side of the shake detection sensor 170 is shielded by the metal plate 380. Further, the metal plate 380 is disposed between the shake detection sensor 170 and the imaging element 15 (see FIGS. 2(a) and 2(b)) and thus the metal plate 380 functions also as a shield for the under face side of the imaging element 15. The fourth flat plate portion 340 of the flexible circuit board 300 is electrically connected with the imaging element 15, which is described with reference to FIGS. 2(a) and 2(b), through the circuit board 154 (double-side circuit board). The lens drive coils 30s and 30t are also electrically connected with the flexible circuit board 300 through the spring pieces 14e and 14f.

In this embodiment, the shake detection sensor 170 is a surface mounting type gyroscope (angular velocity sensor), which detects two axial angular velocity, preferably detects angular velocities of two axes perpendicular to each other.

When the detection is to be performed, an excitation signal is inputted into the gyroscope to vibrate a pair of vibrators and an angular velocity is detected on the basis of a phase difference between the output signal and the input signal.

The first flat plate portion 310 and the second flat plate portion 320 of the flexible circuit board 300, which are disposed on the rear side of the sensor cover 180, are formed with circular openings 310a and 320a having a larger diameter. The openings 310a and 320a are cut-out portions for disposing a support mechanism 400 which supports the movable module 1 to be capable of being swung on the rear face side of the sensor cover 180. As described above, in this embodiment, the cut-out part is formed in the flexible circuit board 300 and the flexible circuit board 300 is disposed so as to avoid the support mechanism 400. Therefore, a space between the base 220 and the movable module 1 can be utilized as an arrangement space of the flexible circuit board 300.

Center portions in a widthwise direction of the first flat plate portion 310, the bent portion 301, the second flat plate portion 320 and the bent portion 302 are formed with a slit 300a which is extended in the Y-axis direction. The slit 300a is continuously extended from the opening 310a which is formed in the first flat plate portion 310 to the bent portion 302. Therefore, since the flexible circuit board 300 is formed with the slit 300a and the openings 310a and 320a, the flexible circuit board 300 can be easily deformed in the widthwise direction (X-axis direction). Further, since the flexible circuit board 300 is symmetrically arranged in the X-axis direction, even when the movable module 1 is swung in any direction around the Y-axis, forces of the flexible circuit board 300 applied to the movable module 1 are equivalent to each other. Therefore, the movable module 1 can be swung appropriately and thus shake correction is performed surely. In addition, the lead-out portion of the flexible circuit board 300 from the movable module 1 is provided with the bent portions 301 and 302 in the Y-axis direction. Therefore, when the movable module 1 is swung around the X-axis, a returning force of deformed flexible circuit board 300 into its original shape is hard to affect swing of the movable module 1.

Figure 11A:
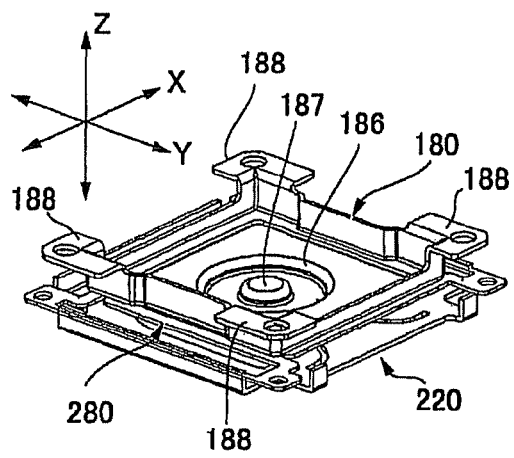
FIGS. 11(a), 11(b), 11(c) and 11(d) are explanatory views showing structural members structuring a support mechanism in an optical unit with shake correcting function in accordance with an embodiment of the present invention.
Figure 11B:
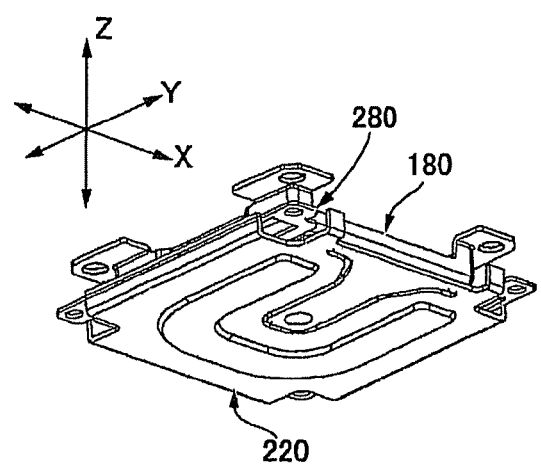
Figure 11C:
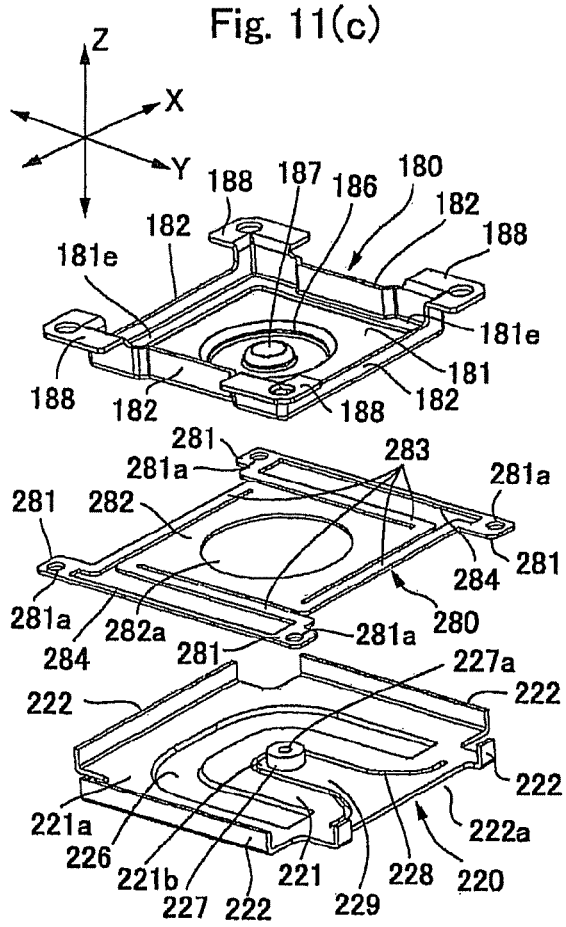
Figure 11D:
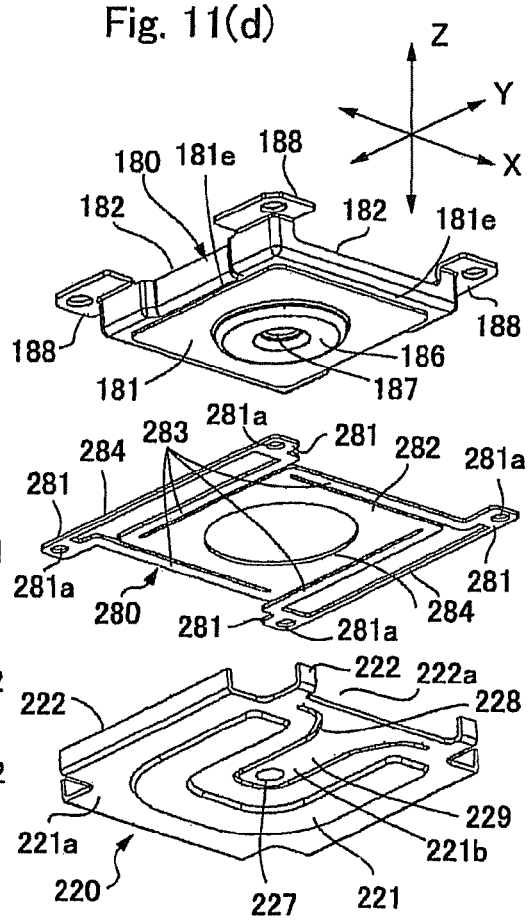
Figure 12A:
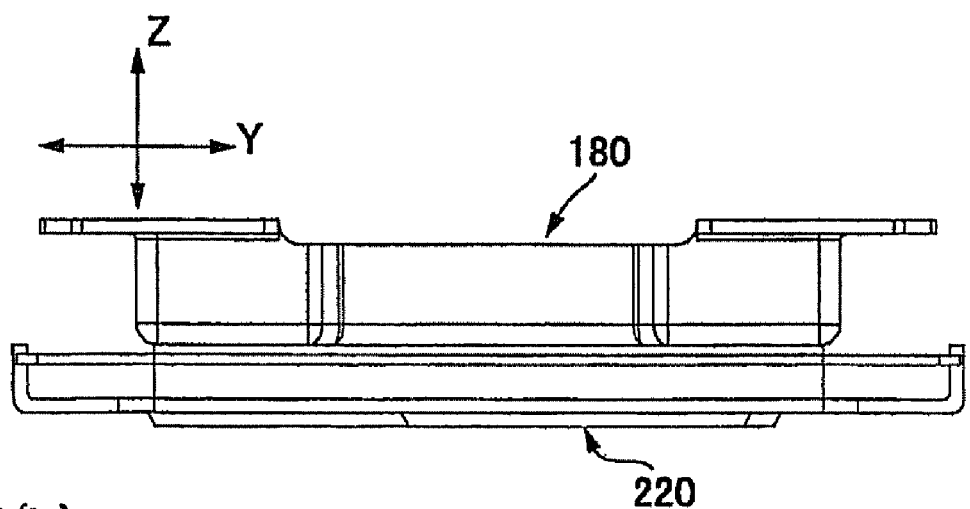
FIG. 12(a) is an explanatory view showing a base, a spring member and a sensor cover of an optical unit with shake correcting function in accordance with an embodiment of the present invention which is viewed from an X-axis direction.
Figure 12B:
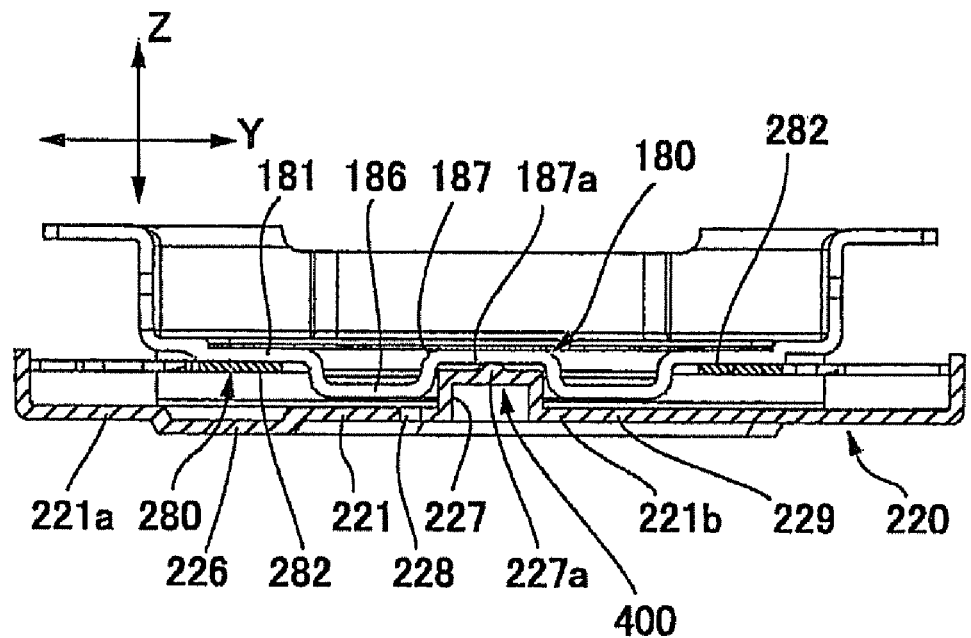
FIG. 12(b) is its sectional view.

FIGS. 11(a) through 11(d) are explanatory views showing structural members which structure the support mechanism 400 and the like in the optical unit 200 with shake correcting function to which the present invention is applied. FIG. 11(a) is a perspective view showing the base 220, the spring member 280 and the sensor cover 180 in the optical unit 200 with shake correcting function which are viewed from the front side, FIG. 11(b) is their perspective view which is viewed from the rear side, FIG. 11(c) is their exploded perspective view which is viewed from the front side, and FIG. 11(d) is their exploded perspective view which is viewed from the rear side. FIG. 12(a) is an explanatory view showing the base 220, the spring member 280 and the sensor cover 180 in the optical unit 200 with shake correcting function to which the present invention is applied and which is viewed from the X-axis direction, and FIG. 12(b) is their sectional view.

The bottom plate part 181 of the sensor cover 180, which is described with reference to FIGS. 4(a) and 4(b), FIGS. 5(a) and 5(b), FIG. 9 and FIG. 10, is formed so that, as shown in FIGS. 11(a) through 11(d), when viewed from the front side, a center circular portion 186 is dented on the rear side and a recessed part 187 is formed at a center portion of the circular portion 186 so as to protrude toward the front side in a bottomed cylindrical shape and so that its under face is opened toward the rear side.

The base 220 which is disposed on the rear side and faces the sensor cover 180 is structured so that four side plate parts 222 are stood up from an outer circumferential edge of the rectangular bottom plate part 221 toward the front side, and one of the side plate parts 222 facing in the Y-axis direction is formed with the cut-out part 222a for extending the flexible circuit board 300 to the outside which is described with reference to FIGS. 9 and 10. A center portion of the bottom plate part 221 of the base 220 is formed with a support protruded part 227 in a bottomed cylindrical shape which is protruded toward the front side (upper side). A front end face of the support protruded part 227 is formed with a small protruded part 227a in a hemispheric shape. Therefore, as shown in FIG. 12(a), when the sensor cover 180 is disposed on the front side (upper side) of the base 220, as shown in FIGS. 4(a) and 4(b), FIGS. 5(a) and 5(b) and FIG. 12(b), the support protruded part 227 of the base 220 is fitted to the recessed part 187 of the sensor cover 180 and the small protruded part 227a is abutted with the bottom under face 187a of the recessed part 187.

As described above, in this embodiment, a pivot part is formed between the base 220 of the fixed body 210 and the sensor cover 180 of the movable module 1 by the bottom under face 187a of the recessed part 187 and the small protruded part 227a of the support protruded part 227. The pivot part structures the support mechanism 400 which enables the movable module 1 to swing with respect to the fixed body 210. In this embodiment, the support mechanism 400 is disposed on the rear side of the shake detection sensor 170 at a position superposed on the shake detection sensor 170 in the Z-axis direction.

In FIGS. 11(a) through 11(d), the base 220 is a press-worked product made of a metal plate. When viewed from the front side (upper side), the bottom plate part 221 is formed with an outer peripheral region 221a and a recessed part 226 which is dented toward the rear side between the center region 221b where the support protruded part 227 is formed and the outer peripheral region 221a. The recessed part 226 is formed to surround three sides of the center region 221b where the support protruded part 227 is formed. Further, the center region 221b of the bottom plate part 221 of the base 220 is formed with a slit 228 which surrounds three sides of the region where the support protruded part 227 is formed. A flat spring part 229 extending in the Y-axis direction is formed by the slit 228. Therefore, the support protruded part 227 is formed at the tip end of the flat spring part 229. Accordingly, when the flat spring part 229 is deformed in the Z-axis direction, the entire support mechanism 400 is displaced in the Z-axis direction.

In this embodiment, the flat spring part 229 is located on a slightly front side with respect to the rear face of the base 220. Therefore, as shown in FIGS. 4(a) and 4(b), the rear face of the flat spring part 229 is located on the front side by a predetermined dimension "G10" with respect to the rear face of the base 220 and the rear end edge of the fixed cover 260.

The spring member 280 for urging the movable module 1 toward the base 220 is disposed between the sensor cover 180 of the movable module 1 and the base 220. The spring member 280 is a flat spring having a rectangular shape and is formed by applying press working to a metal thin plate made of phosphor bronze, beryllium copper, nonmagnetic SUS steel material or the like, or by etching processing using a photo lithography technique.

Four corner portions of the spring member 280 are formed with a fixed body side connecting part 281 which is connected with the fixed body 210. In this embodiment, the fixed body side connecting parts 281 are fixed to the rear side stopper member 270 shown in FIG. 4(a) through FIG. 7 which is a member structuring the fixed body 210. Further, small openings 281a are formed in the fixed body side connecting parts 281 of the spring member 280 and small protruded parts 277a are formed in four corner portions on the rear side face of the rear side stopper member 270. Therefore, after the small protruded parts 277a of the rear side stopper member 270 are fitted to the small openings 281a of the spring member 280 to make the spring member 280 and the rear side stopper member 270 position to each other, when adhesion or caulking is performed, the fixed body side connecting parts 281 are connected with the fixed body 210.

The center portion of the spring member 280 is formed with a movable module side connecting part 282 in a substantially rectangular shape which is connected with the sensor cover 180 of the movable module 1. A center region of the movable module side connecting part 282 is formed with a circular opening 282a to which a circular portion 186 protruded toward the rear side from the bottom plate part 181 of the sensor cover 180 is fitted. The movable module side connecting part 282 of the spring member 280 is fixed to the rear face of the bottom plate part 181 of the sensor cover 180 by a method such as adhesion.

The spring member 280 is formed in a gimbal-spring shape which is provided with four arm parts 283 having a thinner width whose both ends are connected with the center movable module side connecting part 282 and with four fixed body side connecting parts 281. In this embodiment, four arm parts 283 are respectively extended in the X-axis direction or the Y-axis direction along the side parts of the movable module side connecting part 282. Further, the movable module side connecting part 282 of the spring member 280 is located on the front side with respect to the fixed body side connecting parts 281 in the state where the spring member 280 is mounted on the optical unit 200 with shake correcting function. Therefore, the arm parts 283 urge the movable module 1 toward the base 220.

In this embodiment, each of four arm parts 283 is extended from the fixed body side connecting part 281 in the same circumferential direction and four arm parts 283 are provided with the same shape and size and are disposed with an equal angular distance around the optical axis. Therefore, four arm parts 283 are formed in rotational symmetry at 90 degrees, 180 degrees and 270 degrees.

In this embodiment, the first flat plate portion 310 and the second flat plate portion 320 of the flexible circuit board 300, which are described with reference to FIGS. 9 and 10, are disposed between the spring member 280 and the base 220 on the rear side of the sensor cover 180. Therefore, in the spring member 280, two fixed body side connecting parts 281 are connected with each other in the X-axis direction through beam parts 284 but the beam parts 284 are not formed in the Y-axis direction and cut-out parts are formed between two fixed body side connecting part 281. Therefore, the flexible circuit board 300 can be passed through between the fixed body side connecting parts 281 in one of the Y-axis direction.

Further, in the rear face of the bottom plate part 181 of the sensor cover 180, a portion superposed on the arm parts 283 of the spring member 280 in the Z-axis direction is formed as a recessed part 181e which is dented toward the front side in comparison with a region where the movable module side connecting part 282 of the spring member 280 is connected. Therefore, the bottom plate part 181 of the sensor cover 180 is not abutted with the arm parts 283 and, even when the movable module 1 is swung to deform the spring member 280, the bottom plate part 181 of the sensor cover 180 and the arm parts 283 are not abutted with each other.

In this embodiment, as shown in FIGS. 4(a) through 7, two sets of magnetic drive mechanisms for shake correction are structured which are comprised of a first magnetic drive mechanism 250x for shake correction capable of swinging the movable module 1 around the X-axis with the support mechanism 400 as a supporting point and a second magnetic drive mechanism 250y for shake correction capable of swinging the movable module 1 around Y-axis with the support mechanism 400 as a supporting point as a magnetic drive mechanism for shake correction which generates a magnetic drive force for swinging the movable module 1. Structures of the first magnetic drive mechanism 250x for shake correction and the second magnetic drive mechanism 250y for shake correction will be described below.

In the movable module 1, a shake correction magnet 240x (first shake correction magnet) formed in a rectangular plate shape which structures a first magnetic drive mechanism 250x for shake correction is held on outer faces of two side plate parts 162 of the module cover 160 facing in the Y-axis direction, and a shake correction magnet 240y (second shake correction magnet) formed in a rectangular plate shape which structures a second magnetic drive mechanism 250y for shake correction is held on outer faces of the other two side plate parts 162 facing in the X-axis direction of the module cover 160. Each of the shake correction magnets 240x and 240y is formed in a rectangular flat plate-shaped permanent magnet. In this embodiment, the shake correction magnets 240x and 240y are structured of two flat plate-shaped permanent magnets which are arranged in the Z-axis direction and, in the flat plate-shaped permanent magnet, its outer face and inner face are magnetized in different poles from each other. Further, two pieces of the flat plate-shaped permanent magnet which are arranged in the Z-axis direction are magnetized in reverse directions. In accordance with an embodiment of the present invention, the shake correction magnets 240x and 240y may be structured by means of that one piece of permanent magnet is magnetized so as to have two pairs of different polarities.

Further, in the fixed body 210, a shake correction coil 230x (first coil for shake correction) which structures the first magnetic drive mechanism 250x for shake correction is adhesively fixed to inner faces of two side plate parts 262 of the fixed cover 260 facing in the Y-axis direction, and a shake correction coil 230y (second coil for shake correction) which structures the second magnetic drive mechanism 250y for shake correction is adhesively fixed to inner faces of the other two side plate parts 262 of the fixed cover 260 facing in the X-axis direction. The shake correction coils 230x and 230y are respectively faced to the shake correction magnets 240x and 240y. Further, two effective side parts located in the Z-axis direction of the shake correction coils 230x and 230y are respectively faced to two pieces arranged in the Z-axis direction of the flat plate-shaped permanent magnet in the shake correction magnets 240x and 240y. In this embodiment, respective end parts of the shake correction coils 230x and 230y are electrically connected with the outside through the flexible circuit board 300 or through an another flexible circuit board. The side plate part 262 of the fixed cover 260 is formed with a small opening part 262a which is utilized, for example, to apply an adhesive for reinforcement after the shake correction coils 230x and 230y have been fixed to the side plate parts 262.

As described above, in this embodiment, a pair of the first magnetic drive mechanisms 250x for shake correction is structured at two portions so as to face in the Y-axis direction and so as to superpose the support mechanism 400 therebetween for swinging the movable module 1 around the X-axis. Two shake correction coils 230x in the first magnetic drive mechanisms 250x for shake correction are electrically connected so as to generate magnetic-drive forces in the movable module 1 in the same direction around the X-axis when energized. Therefore, two first magnetic drive mechanisms 250x for shake correction apply moments in the same direction around the X-axis passing through the support mechanism 400 to the movable module 1 when two shake correction coils 230x are energized. Further, in this embodiment, a pair of the second magnetic drive mechanisms 250y for shake correction is structured at two portions so as to face in the X-axis direction and so as to superpose the support mechanism 400 therebetween for swinging the movable module 1 around the Y-axis. Two shake correction coils 230y in the second magnetic drive mechanisms 250y for shake correction are electrically connected so as to generate magnetic-drive forces in the movable module 1 in the same direction around the Y-axis when energized. Therefore, two second magnetic drive mechanisms 250y for shake correction apply moments in the same direction around the Y-axis passing through the support mechanism 400 to the movable module 1 when two shake correction coils 230y are energized.

In this embodiment, the module cover 160 is made of magnetic body and functions as a yoke to the shake correction magnets 240x and 240y. Further, a rear side end part of the module cover 160 is formed with a small bent part 169 which is bent toward outside and the bent part 169 functions to enhance a flux concentrating performance.

In a cell phone with a camera on which the optical unit 200 with shake correcting function structured as described above is mounted, the shake detection sensor 170 such as a gyroscope is mounted on the movable module 1 to detect shake at the time of photographing. A control section 800 which will be described below with reference to FIGS. 15 through 17 supplies an electric current to one or both of the shake correction coils 230x and the shake correction coils 230y based on a detection result with the shake detection sensor 170 and the movable module 1 is swung around one or both of the X-axis and the Y-axis. When these swing operations are synthesized, the movable module 1 can be swung in the entire "X-Y" plane. Therefore, all shakes occurred in a cellular phone with a camera can be corrected surely.

In this embodiment, the shake detection sensor 170 is mounted on the movable module 1. Therefore, since shake of the optical axis "L" is directly detected by the shake detection sensor 170, the shake can be corrected with a high degree of accuracy.

Further, since the movable module 1 is swung with the support mechanism 400 structured on the rear side of the movable module 1 as a center, deformation of the flexible circuit board 300 is extremely small. Therefore, the returning force to its original shape is small when the flexible circuit board 300 is deformed and thus the movable module 1 can be swung quickly.

In this embodiment, magnetic center positions in the Z-axis direction of magnetic forces acting on the movable module 1 with the swing supporting point of the support mechanism 400 as a reference are located at farther positions than the center position in the Z-axis direction of the movable module 1. Therefore, magnetic-drive forces of the first magnetic drive mechanism 250x for shake correction and the second magnetic drive mechanism 250y for shake correction which are required to swing the movable module 1 may be small.

On the other hand, in a case that the swing supporting point of the support mechanism 400 is set as a reference, when magnetic center positions in the Z-axis direction of magnetic forces acting on the movable module 1 are located at nearer positions than the center position in the Z-axis direction of the movable module 1, the movable module 1 can be swung largely with a little displacement and thus responsiveness of shake correction is superior.

Figure 13A:
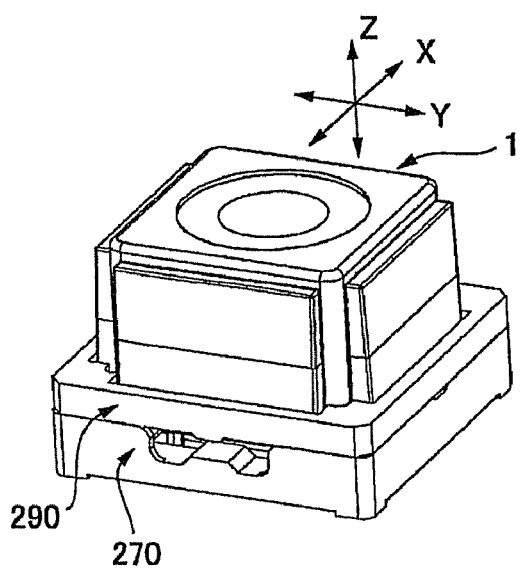
FIGS. 13(a), 13(b), 13(c) and 13(d) are explanatory views showing structural members for restricting a moving range of the movable module in an optical unit with shake correcting function in accordance with an embodiment of the present invention.
Figure 13B:
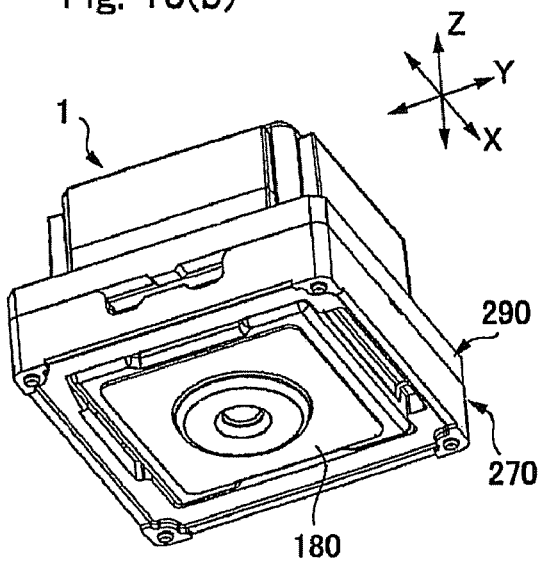
Figure 13C:
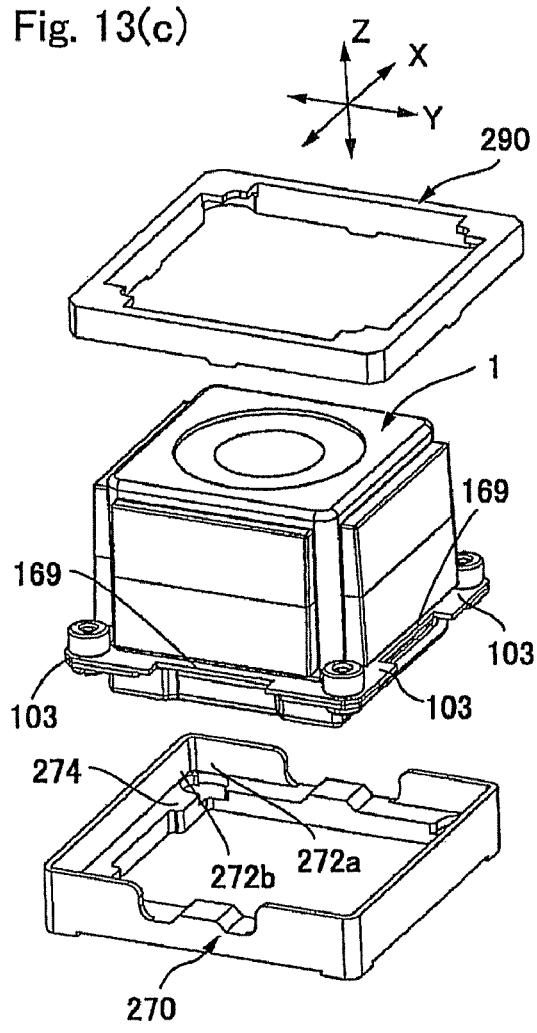
Figure 13D:
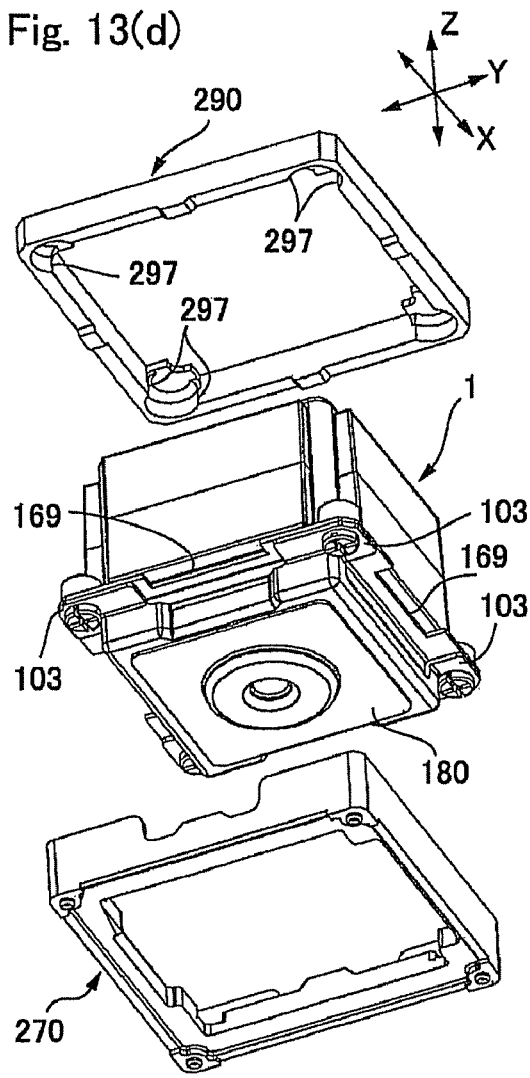
Figure 14A:
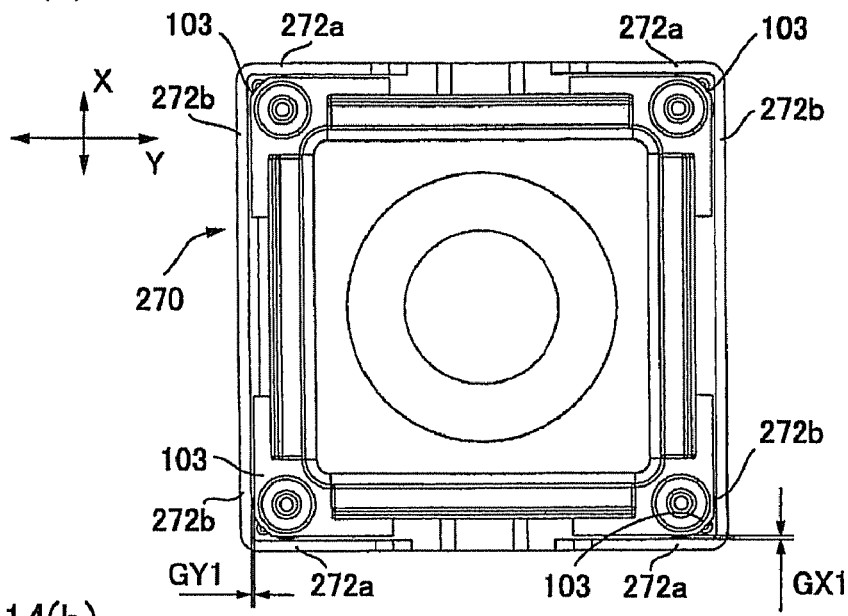
FIGS. 14(a), 14(b) and 14(c) are explanatory views showing a mechanism for restricting a moving range of the movable module in an optical unit with shake correcting function in accordance with an embodiment of the present invention.
Figure 14B:
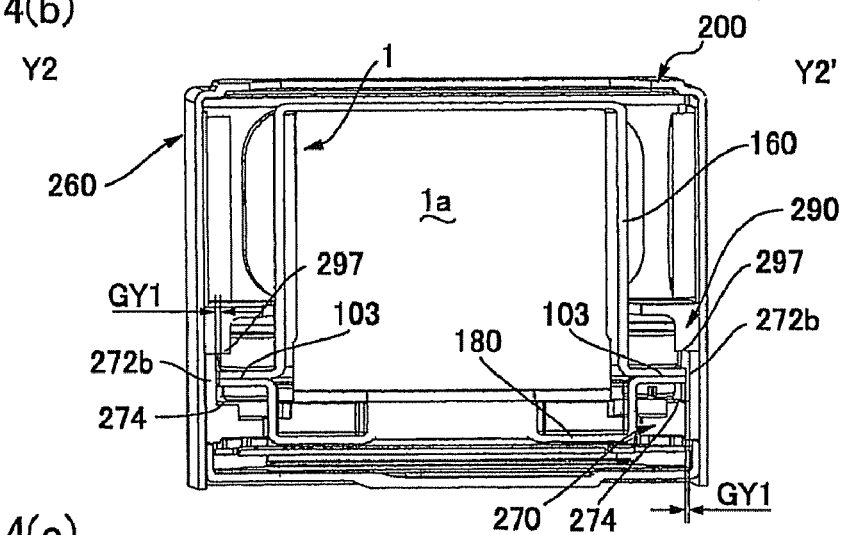
Figure 14C:
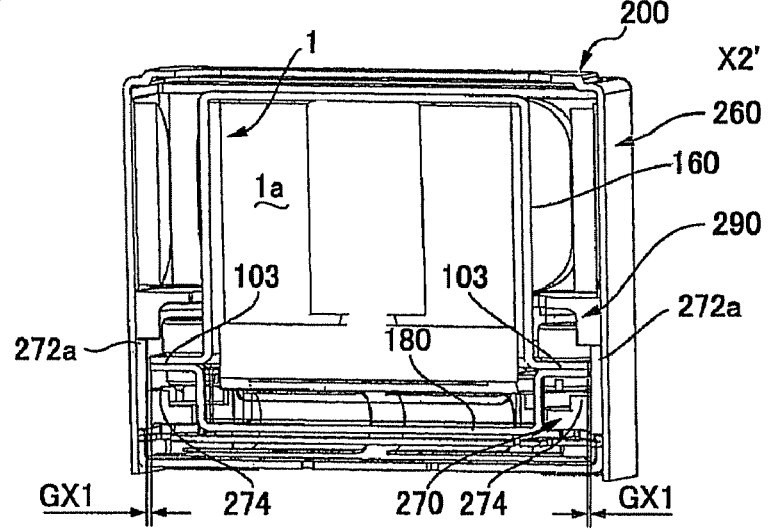

FIGS. 13(a) through 13(d) are explanatory views showing structural members restricting a moving range of the movable module 1 in the optical unit 200 with shake correcting function to which the present invention is applied. FIG. 13(a) is a perspective view showing a state where a rear side stopper member 270 and a front side stopper member 290 are disposed in the movable module 1 and which is viewed from the front side, FIG. 13(b) is their perspective view which is viewed from the rear side, FIG. 13(c) is their exploded perspective view which is viewed from the front side, and FIG. 13(d) is their exploded perspective view which is viewed from the rear side. FIGS. 14(a), 14(b) and 14(c) are explanatory views showing a mechanism for restricting a moving range of the movable module 1 in the optical unit 200 with shake correcting function to which the present invention is applied. FIG. 14(a) is a plan view showing a state where a rear side stopper member is disposed in the movable module in the optical unit 200 with shake correcting function to which the present invention is applied and which is viewed from the front side, FIG. 14(b) is a sectional view showing the optical unit 200 with shake correcting function which is cut by the line "Y2-Y2'" in FIG. 1(a) passing near its corner portions, and FIG. 14(c) is a sectional view showing the optical unit 200 with shake correcting function which is cut by the line "X2-X2'" in FIG. 1(a) passing near its corner portions.

As shown in FIG. 4(a) through FIG. 7 and FIGS. 13(a) through 13(d), in this embodiment, a front side stopper member 290 and a rear side stopper member 270 formed in a rectangular frame shape are disposed around the movable module 1. Moving ranges of the movable module 1 in both directions in the X-axis direction, both directions in the Y-axis direction and both directions in the Z-axis direction, and both directions around the X-axis, both directions around the Y-axis and both directions around the Z-axis are restricted by the front side stopper member 290 and the rear side stopper member 270.

As shown in FIGS. 14(a), 14(b) and 14(c), when viewed from the front side, each of four corner portions of the rear side stopper 270 is provided with an inner wall 272a which faces the protruded part 103 of the corner portion of the movable module 1 projecting in the X-axis direction and the Y-axis direction on an outer side in the X-axis direction through a little gap space "GX1" and an inner wall 272b which faces the protruded part 103 on an outer side in the Y-axis direction through a little gap space "GY1". Therefore, moving ranges of the movable module 1 are restricted in both directions in the X-axis direction, both directions in the Y-axis direction, both directions around the X-axis, both directions around the Y-axis and both directions around the Z-axis.

Further, as shown in FIGS. 14(b) and 14(c), the rear side stopper 270 is provided with a plate-like part 274 which faces the protruded part 103 on the rear side in the Z-axis direction. In addition, a corner part 297 formed in a frame portion of the front side stopper 290 faces the protruded part 103 on the front side in the Z-axis direction. Therefore, moving ranges in both directions in the Z-axis direction of the movable module 1 is restricted.

In this embodiment, the front side stopper member 290 and the rear side stopper member 270 are made of resin and thus, different from metal, they are provided with satisfactory impact absorption performance and vibration absorption performance. Therefore, even when the movable module 1 is abutted with the front side stopper member 290 and the rear side stopper member 270, noise and vibration can be reduced.

In the support mechanism 400 shown in FIG. 4(a) through FIG. 5(b) and FIGS. 12(a) and 12(b), the support protruded part 227 of the base 220 is fitted to the recessed part 187 of the sensor cover 180. Therefore, in this embodiment, moving ranges of the movable module 1 in both directions in the X-axis direction and both directions in the Y-axis direction are restricted also by the support mechanism 400. In other words, as shown in FIGS. 4(*a*) and 4(*b*), a little gap space "GX2" is formed in the X-axis direction and a little gap space "GY2" is formed in the Y-axis direction between an outer peripheral face of the support protruded part 227 and an inner peripheral face of the recessed part 187.

In addition, in the support mechanism 400 shown in FIG. 4(*a*) through. FIG. 5(*b*) and FIGS. 12(*a*) and 12(*b*), the small protruded part 227*a* of the support protruded part 227 of the base 220 is abutted with the bottom under face 187*a* of the recessed part 187. Therefore, displacement toward the rear side in the Z-axis direction of the movable module 1 is restricted also by the support mechanism 400. In this embodiment, when the movable module 1 is rapidly displaced toward the rear side in the Z-axis direction by an impact such as dropping, load acting between the small protruded part 227*a* and the bottom under face 187*a* of the recessed part 187 is concentrated until the protruded part 103 of the movable module 1 is abutted with the plate-like part 274 of the rear side stopper 270. Therefor, the small protruded part 227*a* or the bottom under face 187*a* of the recessed part 187 may be deformed. However, in this embodiment, the support protruded part 227 is formed in the tip end part of the flat spring part 229 which is formed in the base 220. Therefore, when the movable module 1 is displaced toward the rear side in the Z-axis direction, the entire support mechanism 400 is displaced in the Z-axis direction. Therefore, even when load is concentrated on the small protruded part 227*a* and the bottom under face 187*a* of the recessed part 187 due to impact such as dropping, the small protruded part 227*a* and the bottom under face 187*a* of the recessed part 187 are prevented from being deformed.

In this embodiment, as shown in FIGS. 4(*a*) and 4(*b*), the flat spring part 229 is located toward the front side by the predetermined dimension "G10" with respect to the rear face of the base 220 and the rear end edge of the fixed cover 260. Therefore, even when the movable module 1 is rapidly displaced toward the rear side in the Z-axis direction due to impact such as dropping to cause the flat spring part 229 to displace toward the rear side, the flat spring part 229 does not project toward the rear side from the rear face of the base 220 and the rear end edge of the fixed cover 260.

Figure 15:
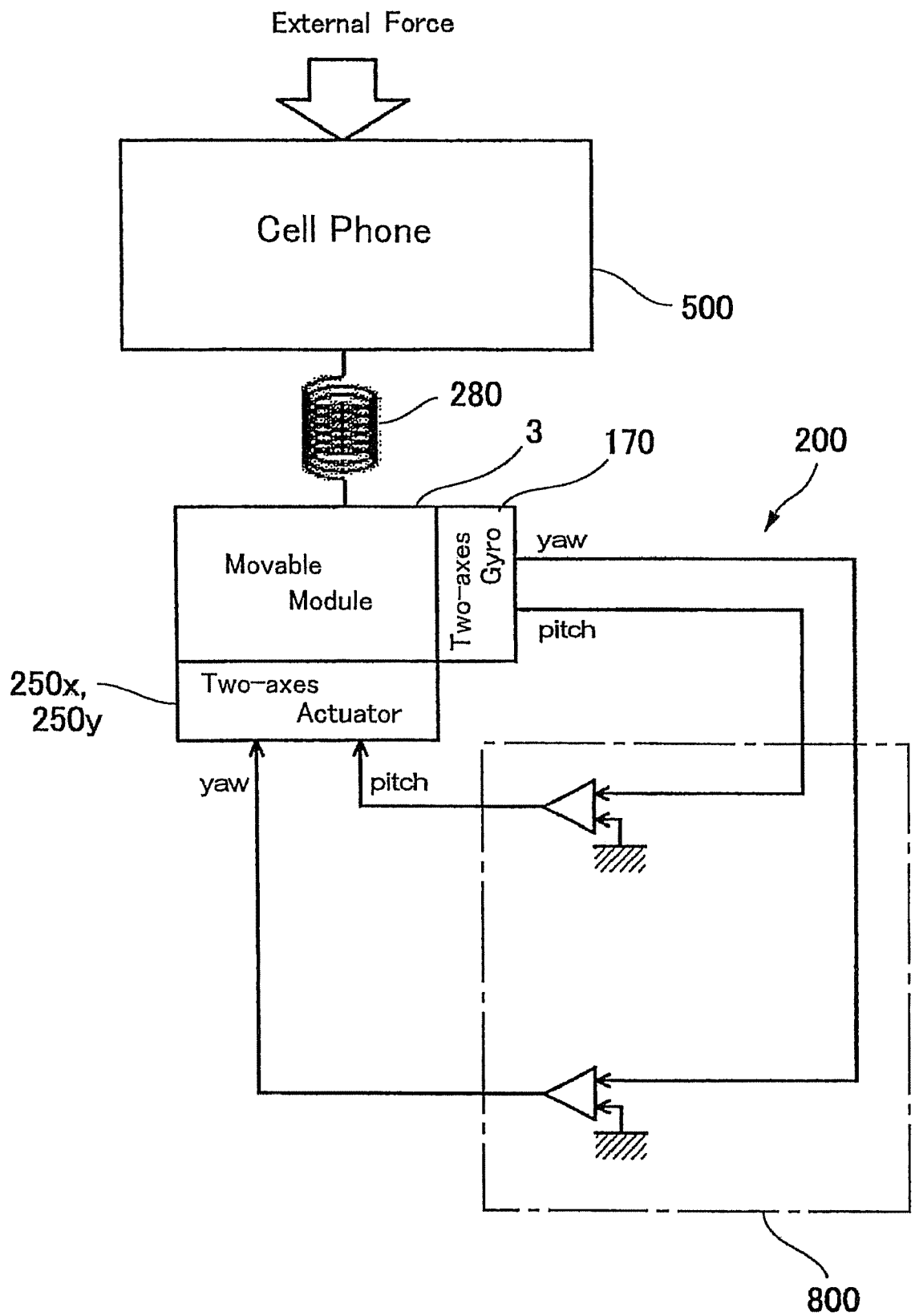
FIG. 15 is a schematic view showing a control method for shake correction in an optical unit with shake correcting function in accordance with an embodiment of the present invention.
Figure 16A:
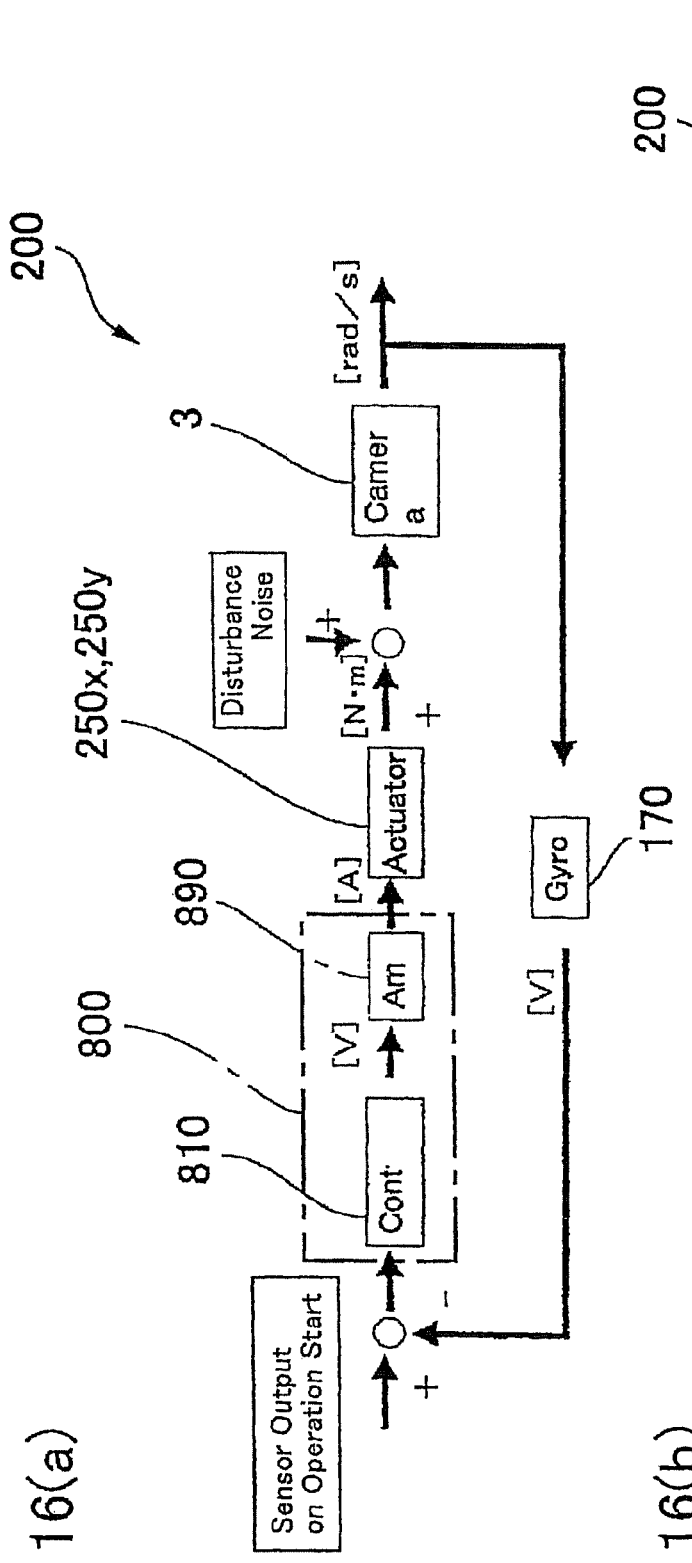
FIGS. 16(a) and 16(b) are block diagrams showing a structure of a control section for performing shake correction in an optical unit with shake correcting function in accordance with an embodiment of the present invention.
Figure 16B:
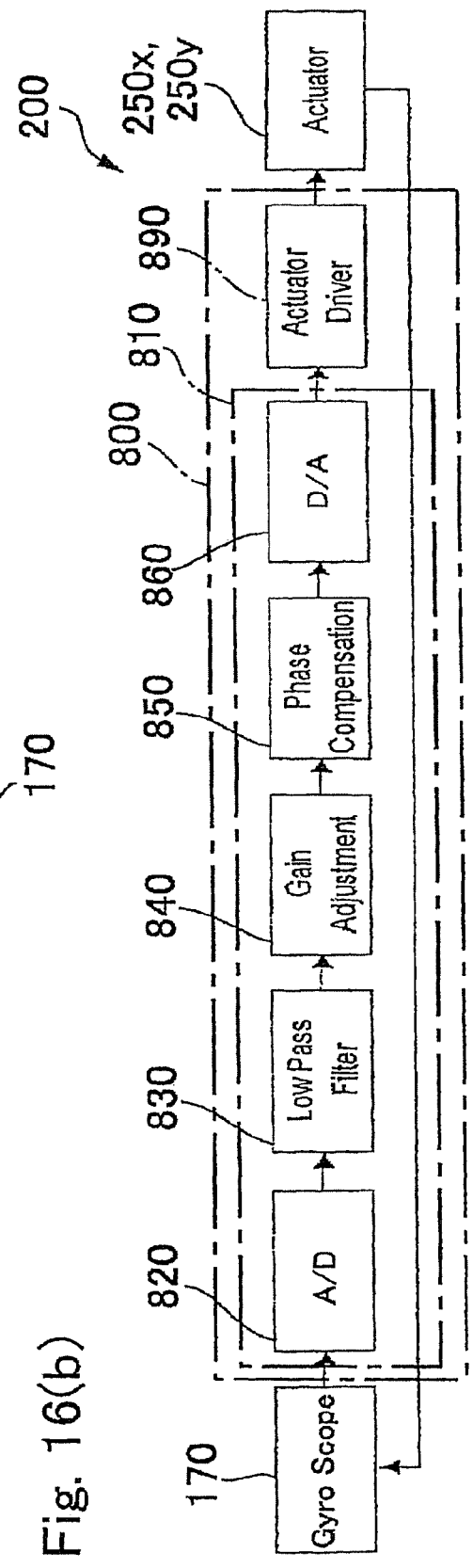
Figure 17A:
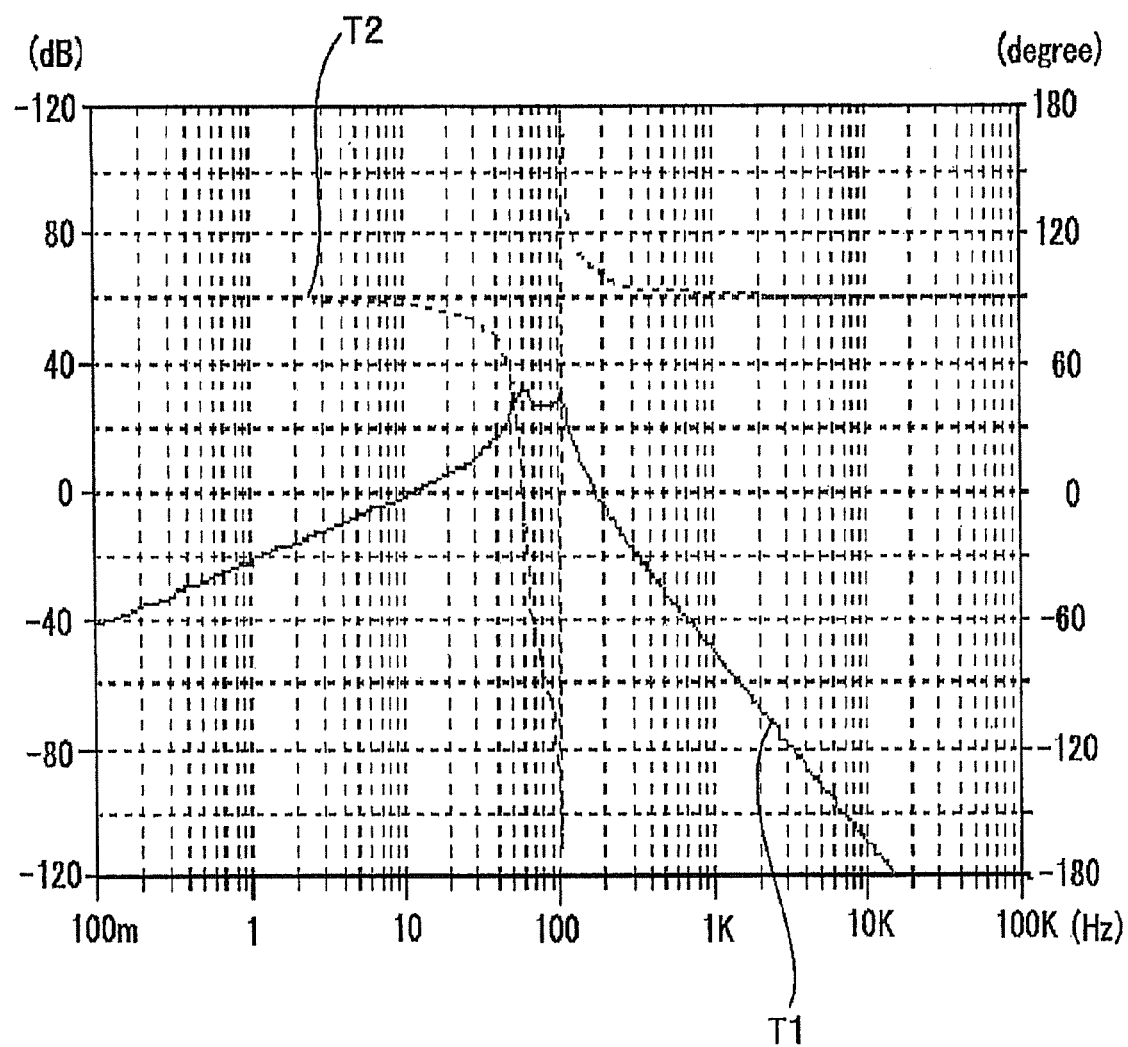
FIGS. 17(*a*), 17(*b*) and 17(*c*) are explanatory graphs showing compensation of servo gain in an optical unit with shake correcting function in accordance with an embodiment of the present invention.
Figure 17B:
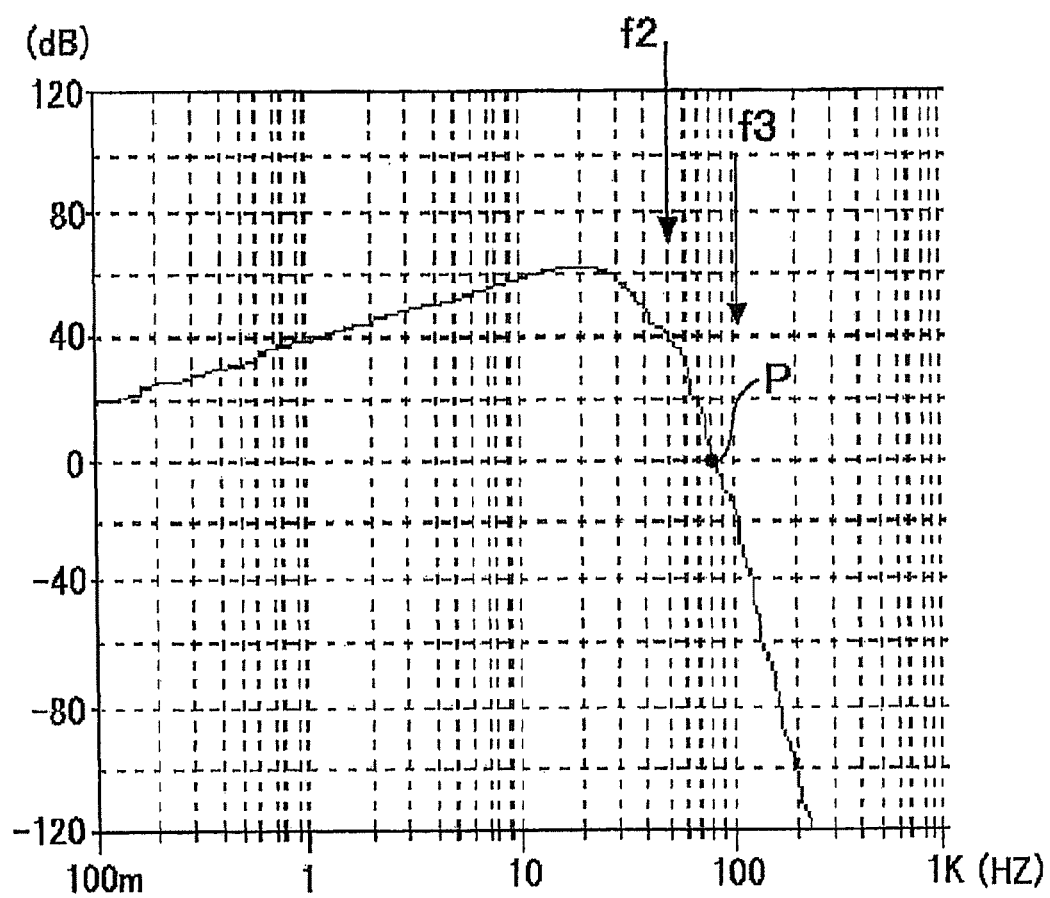
Figure 17C:
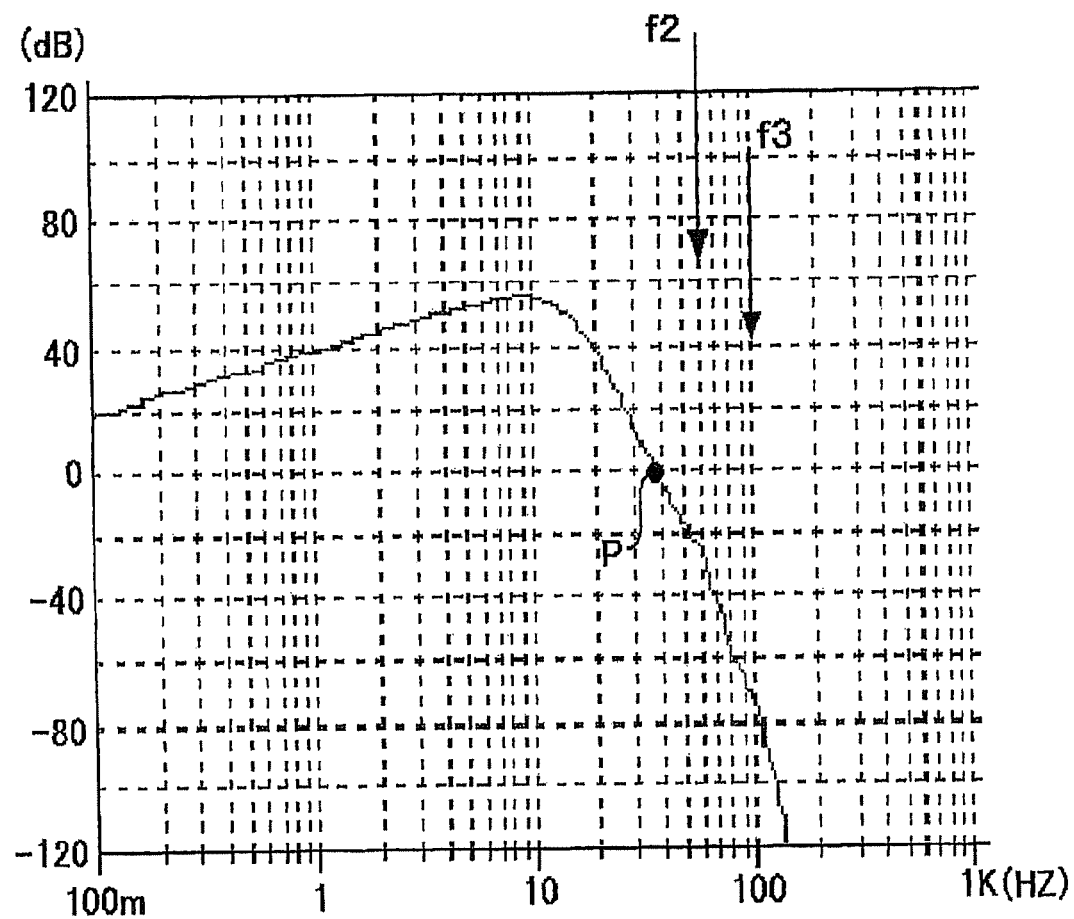

FIG. 15 is a schematic view showing a control method for shake correction in an optical unit with shake correcting function in accordance with an embodiment of the present invention. FIGS. 16(*a*) and 16(*b*) are block diagrams showing a structure of a control section for performing shake correction in an optical unit with shake correcting function in accordance with an embodiment of the present invention. FIGS. 17(*a*), 17(*b*) and 17(*c*) are explanatory graphs showing compensation, of servo gain in an optical unit with shake correcting function in accordance with an embodiment of the present invention. FIG. 17(*a*) is an explanatory graph showing open-loop frequency characteristics before servo gain is compensated in an optical unit with shake correcting function in accordance with an embodiment of the present invention, FIG. 17(*b*) is an explanatory graph showing a frequency characteristic after the servo gain has been compensated, and FIG. 17(*c*) is an explanatory graph showing a frequency characteristic after the servo gain has been compensated under another condition. In FIG. 17(*a*), "T1" shows a gain characteristic and "T2" shows a phase characteristic.

As shown in FIG. 1(*c*), the optical unit 200 with shake correcting function in this embodiment is mounted on an apparatus 500 such as a cell phone and used to be photographed. Therefore, a longitudinal shake around the X-axis and a lateral shake around the Y-axis may be occurred by a shake of hand when a shutter is pressed. In order to prevent this problem, in this embodiment, as shown in FIG. 15, the shake detection sensor 170 comprised of a two-axial gyroscope is mounted on the movable module 200, and the first drive mechanism 250*x* for shake correction and the second drive mechanism 250*y* for shake correction are closed-loop controlled by a control section 800 so as to cancel the shake which is detected by the shake detection sensor 170. In other words, when a gyroscope which is used as the shake detection sensor 170 is used with a single power supply such as +3V or +5V instead of positive and negative power supplies, an angular velocity signal which is outputted from the shake detection sensor 170 varies from a midpoint potential like +1.5V to a positive (+) or a negative (−) direction to output a signal proportional to its direction and magnitude. Therefore, an angular velocity signal which is outputted from the shake detection sensor 170 does not become "zero" (volt) even when no shake is occurred and the midpoint potential is outputted. Accordingly, when the control section 800 controls the first drive mechanism 250*x* for shake correction and the second drive mechanism 250*y* for shake correction so that an angular velocity signal which is outputted from the shake detection sensor 170 becomes to the midpoint potential of a voltage which is applied to the shake detection sensor 170, the first drive mechanism 250*x* for shake correction and the second drive mechanism 250*y* for shake correction are closed-loop controlled so as to cancel the shake which is detected by the shake detection sensor 170.

As a result, the control section 800 makes the first drive mechanism 250*x* for shake correction and the second drive mechanism 250*y* for shake correction carry out closed loop controls so that displacement of the angular velocity signal which is detected by the shake detection sensor 170 becomes zero. Therefore, even when the control section 800 does not obtain an angular displacement quantity of the movable module 3 by integrating an angular velocity signal in the pitching direction and an angular velocity signal in the yawing direction which are outputted from the shake detection sensor 170, the control section 800 can output drive signals for shake correction on the basis of the angular velocity signal in the pitching direction and the angular velocity signal in the yawing direction, which are outputted from the shake detection sensor 170, to the first drive mechanism 250*x* for shake correction and the second drive mechanism 250*y* for shake correction.

In the control section 800, a command signal is outputted from the outside (main optical apparatus) of the optical unit 200 with shake correcting function and a shake control is started on the basis of the command signal. The command signal is outputted in conjunction with a photographing operation. As a specific timing, a command signal may be outputted when a photographing start switch such as a shutter buttons is pressed by one half, when a photographing start switch is pressed by one half and an autofocus operation has been completed, or when a photographing start switch is pressed deeply. Alternatively, shake correction may be always executed during a period when image taken by the camera is displayed on a monitor part.

In order to perform the above-mentioned control, the control section 800 structured in the optical unit 200 with shake correcting function in this embodiment is provided with a structure shown in FIGS. 16(*a*) and 16(*b*). In this embodiment, two sets of the control section 800 are structured for shake correction around the X-axis (pitching direction) and for shake correction around the Y-axis (yawing direction). The two sets of the control section 800 are structured the same as each other and thus, in the following description, only one control section 800 will be described below.

The control section 800 shown in FIGS. 16(*a*) and 16(*b*) generally includes a control circuit 810 and a drive circuit 890 for shake correction. When the movable module 3 is swung by a shake (disturbance noise), the shake detection sensor 170 outputs an angular velocity signal corresponding to the shake to the control circuit 810. The control circuit 810 converts the angular velocity signal which is detected by the shake detection sensor 170 into a control signal for shake correction, which is outputted to the drive circuit 890. The drive circuit 890 generates a drive signal on the basis of the control signal, which is supplied to the first drive mechanism 250*x* for shake correction and/or the second drive mechanism 250*y* for shake correction.

The control circuit 810 generally includes an A/D conversion circuit 820, a gain adjustment circuit 840, a phase compensation circuit 850 and a D/A conversion circuit 860. In the control circuit 810, an angular velocity signal which is detected by the shake detection sensor 170 is converted into a digital signal by the AD conversion circuit 820 and then, the digital signal is converted into a digital control signal through the gain adjustment circuit 840 and the phase compensation circuit 850 and, after that, the digital signal is converted into an analog control signal by the D/A conversion circuit 860 to be outputted to the drive circuit 890. In accordance with an embodiment of the present invention, in a case that an angular velocity signal which is outputted from the shake detection sensor 170 is a digital signal, the A/D conversion circuit 820 is not used. Further, the control circuit 810 may include a high-pass filter (not shown) for removing a DC component from an angular velocity signal which is detected by the shake detection sensor 170. In any case, the control circuit 810 is not provided with an integration circuit for calculating an angular displacement quantity of the movable module 3 from an angular velocity signal which is outputted from the shake detection sensor 170.

The control section 800 is, for example, as shown by the alternate long and short dash line in FIG. 1(*a*), is structured in an IC 900 which is mounted on the flexible circuit board 300 drawn from the movable module 3. Alternatively, the control section 800 may be structured so as to be accommodated in a common package to the shake detection sensor 170 which is shown in FIGS. 4(*a*) and 4(*b*), FIGS. 5(*a*) and 5(*b*) and FIG. 9. In this case, the shake detection sensor 170 and the control section 800 are structured as an integrated circuit such as a hybrid IC.

In this embodiment, the movable module 3 and the fixed body 210 are connected with each other through the spring member 280 and thus it is affected by a mechanical natural (specific) resonance frequency of the spring member 280 which is determined by its elasticity and mass. Further, a vibrator of a gyroscope has a natural resonance frequency, which is commonly a higher value of several tens of kHz in order to enhance detection sensitivity of the Coriolis force. Therefore, a detuning frequency (100 Hz) which is a difference between the excitation side resonance frequency and the detection side resonance frequency becomes a value of the same order as the resonance frequency of the spring system as shown by the line "T1" in FIG. 17(*a*). Further, when the resonance frequency of the spring member 280 is overlapped with 1-15 Hz (from one Hz to fifteen Hz) which is a target frequency of shake correction, resonance may occur.

Accordingly, in this embodiment, the resonance frequency of the spring member 280 is set to be an appropriate value, for example, at 60 Hz. Therefore, in this embodiment, when a frequency of a control signal in the control section 800 for controlling the first drive mechanism 250*x* for shake correction and the second drive mechanism 250*y* for shake correction is set to be "f1", a resonance frequency of the spring member 280 is set to be "f2", and a detuning frequency of the shake detection sensor 170 (gyroscope) is set to be "f3", the frequency "f1" (1-15 Hz) of the control signal, the resonance frequency "f2" of the spring member, and the detuning frequency "f3" of the gyroscope satisfy the following condition:

f1<f2<f3.

Further, in a case that a gain intersecting point when the control section 800 controls the first drive mechanism 250*x* for shake correction and the second drive mechanism 250*y* for shake correction comes near the resonance frequency of the spring member 280 or the detuning frequency of the shake detection sensor 170 (gyroscope), it is affected by the resonance frequency of the spring member 280 or the detuning frequency of the shake detection sensor 170 (gyroscope). Therefore, in the control circuit 810 in this embodiment, a digital low-pass filter 830 for adjusting a servo gain is provided in a succeeding stage of the A/D conversion circuit 820 and, in the frequency characteristic of the servo gain, as shown in FIG. 17(*b*), a gain near the detuning frequency "f3" of the gyroscope is sharply dropped. Accordingly, in the frequency characteristic of the servo gain when the control section 800 controls the first drive mechanism 250*x* for shake correction and the second drive mechanism 250*y* for shake correction, the gain intersecting point "P" satisfies following condition:

f2<gain intersecting point<f3

Therefore, since a necessary gain can be broadly secured to the resonance frequency "f2" of the spring member 280, the spring member is capable of functioning as an active damper to the resonance and the gain is −6 dB or less in the frequency region equal to or higher than the detuning frequency "f3" of the gyroscope. According to the structure described above, the shake of the movable module 3 is corrected without being affected by the resonance frequency of the spring member 280 and the detuning frequency of the shake detection sensor 170 (gyroscope).

In accordance with an embodiment of the present invention, in the digital low-pass filter 830, the frequency characteristic of the servo gain may be compensated as shown in FIG. 17(*c*). In other words, in the frequency characteristic of the servo gain, the gain intersecting point "P" may be set so as to satisfy the following condition:

Gain intersecting point<f2<f3

In this structure, the gain is −6 dB or less in the frequency region equal to or higher than the resonance frequency "f2" of the spring member. Therefore, the shake of the movable module 3 is corrected without being affected by the resonance frequency of the spring member 280 and the detuning frequency of the shake detection sensor 170 (gyroscope).

As described above, in this embodiment, the drive mechanism for shake correction (the first drive mechanism 250*x* for shake correction and the second drive mechanism 250*y* for shake correction) is controlled so as to cancel a shake which is detected by the shake detection sensor 170 (gyroscope). For example, the drive mechanism for shake correction (the first drive mechanism 250*x* for shake correction and the second drive mechanism 250*y* for shake correction) is controlled so that displacement of an angular velocity signal corresponding to a shake outputted from the shake detection sensor 170 (gyroscope) becomes zero. Therefore, it is not necessary that an angular velocity signal is integrated to obtain a quantity of angular displacement and thus the responsiveness of correction is superior. Further, the drive mechanism for shake correction is controlled so that a displacement of an angular velocity signal outputted from the gyroscope becomes zero, in other words, the drive mechanism for shake correction is controlled so as to cancel a shake detected by the gyroscope. Therefore, a closed loop control can be executed as it is. Accordingly, there is no need that an angle of the movable, module is detected by another type of sensor to control so that a difference of a displacement from a command value becomes zero and thus a structure of a control system can be simplified. As a result, the number of components can be reduced and thus the cost of the optical unit with shake correcting function can be reduced.

Figure 18:
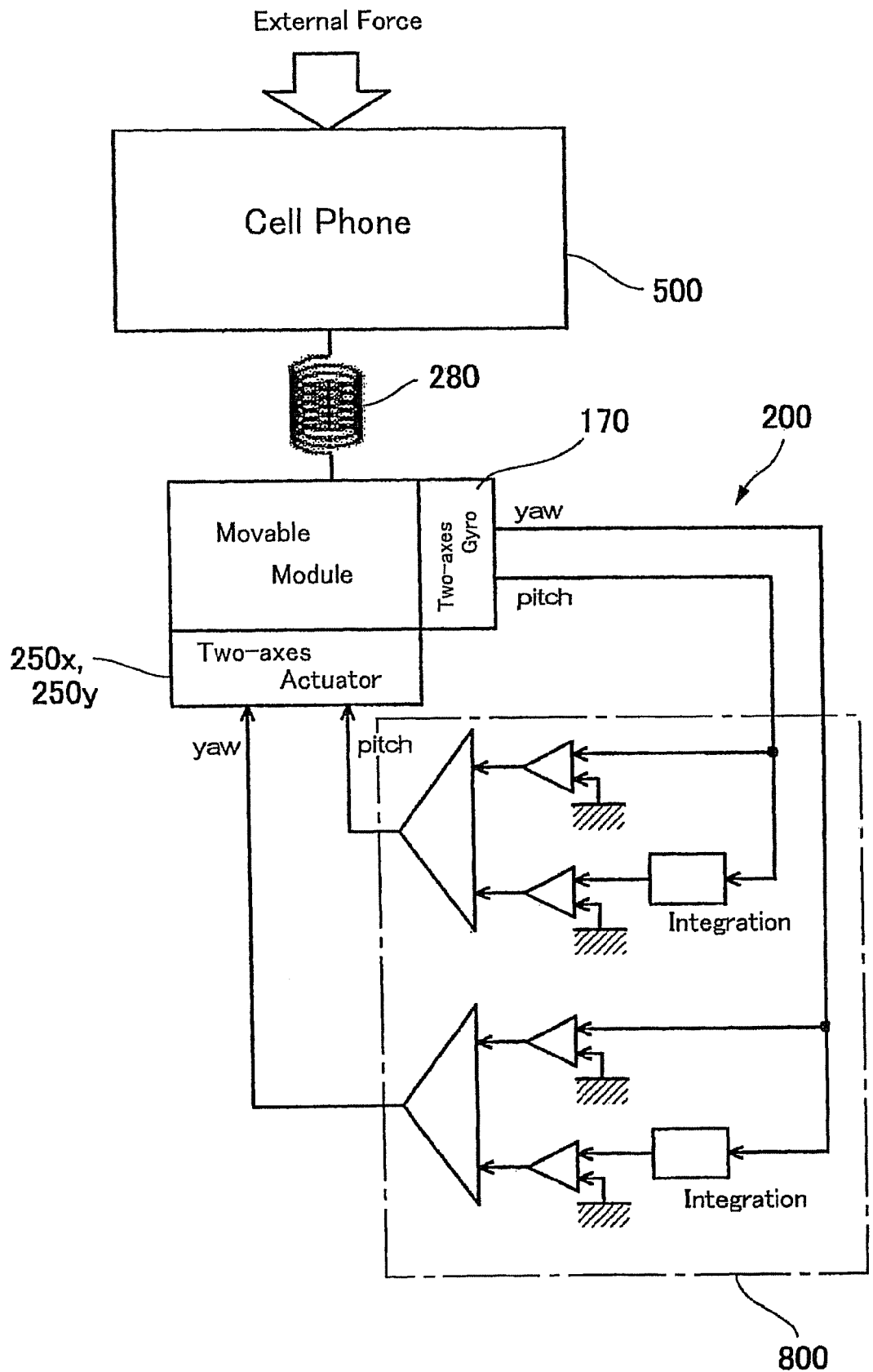
FIG. 18 is a schematic view showing another control method for shake correction in an optical unit with shake correcting function in accordance with an embodiment of the present invention.

FIG. 18 is a schematic view showing another control method for shake correction in an optical unit with shake correcting function in accordance with an embodiment of the present invention. FIGS. 16(a) and 16(b) are block diagrams showing a structure of a control section for performing shake correction in an optical unit with shake correcting function in accordance with the embodiment of the present invention. The embodiment shown in FIG. 15 is structured to control the drive mechanism for shake correction (the first drive mechanism 250$x$ for shake correction and the second drive mechanism 250$y$ for shake correction) so that displacement of an angular velocity signal corresponding to shake outputted from the shake detection sensor 170 (gyroscope) becomes zero. However, as shown in FIG. 18, it may be structured that integration circuits are added to the control section 800. According to this structure, the drive mechanism for shake correction is controlled so that a displacement of an angular velocity signal itself corresponding to a shake outputted from the shake detection sensor 170 (gyroscope) becomes zero, and an angular velocity signal corresponding to a shake outputted from the shake detection sensor 170 (gyroscope) is integrated to control the drive mechanism for shake correction so that a quantity value of angular displacement of the movable module 3 becomes zero.

In this structure, feedback ratios of shake correction with the use of an angular velocity and shake correction with the use of a quantity of angular displacement are set in predetermined conditions. Therefore, shake correction is quickly controlled by using angular velocity and, a portion which is not corrected by this control can be corrected by using a control with the use of a quantity of angular displacement.

In the embodiment described above, both of the first magnetic drive mechanism 250$x$ for shake correction and the second magnetic drive mechanism 250$y$ for shake correction are provided for the movable module 1 as the magnetic drive mechanism for shake correction. However, in accordance with an embodiment of the present invention, in order to correct only shake in a direction where shake easily occurs when a user uses, only one of the first magnetic drive mechanism 250$x$ for shake correction and the second magnetic drive mechanism 250$y$ for shake correction may be provided. In other words, only one of the first magnetic drive mechanism 250$x$ for shake correction and the second magnetic drive mechanism 250$y$ for shake correction may be provided on both sides so as to interpose the support protruded part 227 as a pair. In this case, the extending direction of the flexible circuit board 300 may be set only the Y-axis direction.

In the embodiment described above, in each of the first magnetic drive mechanism 250$x$ for shake correction and the second magnetic drive mechanism 250$y$ for shake correction, the shake correction magnet (shake correction magnets 240$x$ and 240$y$) is held on the movable module 1 which is the movable body, and the shake correction coil (shake correction coils 230$x$ and 230$y$) is held by the fixed body 210. However, the shake correction coil may be held on the movable module 1 which is the movable body, and the shake correction magnet may be held by the fixed body 210.

In the embodiment described above, the spring member 280 is used in which a plurality of arm parts 287 linearly extending in the same circumferential direction as the urging member. However, when a plurality of arm parts 287 are extended in the same circumferential direction, the arm parts 287 may be extended in a curved manner.

In the embodiment described above, only the spring member 280 is used as the urging member for urging the movable module 1 toward the base 220. However, in accordance with an embodiment of the present invention, a magnetic spring which urges the movable module 1 toward the base 220 by magnetic operation and a mechanical spring member which mechanically urges the movable module 1 toward the base 220 may be used as the urging member. As the magnetic spring, a magnetic member is disposed on a rear side with respect to the shake correction magnets 240$x$ and 240$y$ in the fixed body 210. According to this structure, a holding state where the movable module 1 is supported by the support mechanism 400 is surely maintained. Further, since the movable module 1 is urged toward the base 220 only by the magnetic spring, the spring member 280 can be set in a non-deformed state where the spring member 280 does not generate an urging force during a neutral period when the magnetic drive mechanism for shake correction is not operated. In this case, when the movable module 1 is swung, the spring member 280 is deformed to generate an urging force. In other words, the spring member 280 keeps a flat shape during a period when the movable module 1 is not swung. Therefore, a portion having linearity between a force applied to the spring member 280 and a deformed amount of the spring member 280 is utilized effectively and thus the movable module 1 is appropriately swung and the shake correction can be performed surely.

In accordance with an embodiment of the present invention, vibration absorption material such as gel material or elastic sheet is preferably fitted to the connected portions of the arm parts 283 and the fixed side connecting parts 281, to the connected portions of the arm parts 283 and the movable module side connecting parts 282, or to the entire arm parts 283 in the spring member 280. In a case that this measure is performed, when the movable module 1 is swung, vibration of the arm parts 283 can be rapidly stopped and thus vibration of the movable module 1 can be also rapidly stopped.

In the embodiment described above, the small protruded part 227$a$ is formed at the tip end of the support protruded part 227 but the entire support protruded part 227 may be formed in a hemispherical shape. Further, in the embodiment described above, the support protruded part 227 is formed in the base 220 and the recessed part 187 is formed in the sensor cover 180. However, a support protruded part is formed in the sensor cover 180 and a recessed part for receiving the support protruded part may be formed in the base 220.

Further, in order to support the movable module 1 to be capable of being swung with an opposite side to an object to be photographed side as its swinging center, a plurality of wire suspensions which are extended toward the object to be photographed side from the opposite side to the object to be photographed side is used as a swing support part instead of the pivot part and the movable module 1 may be supported by a plurality of the wire suspensions. In this case, even when a pivot part or the like is not provided for determining a swing center of the movable module 1, the movable module 1 can be supported to be capable of swinging.

In addition, instead of using a pivot part, one piece or plural pieces of the spring members 280 formed in a flat spring shape shown in FIG. 6 may be used to support the movable module 1 to be capable of swinging. Also in this case, similarly to a case where the wire suspension is used, even when a pivot part or the like is not provided for determining a swing center of the movable module 1, the movable module 1 can be supported to be capable of swinging. In order to utilize the above-mentioned structure, when the movable module 1 is supported by one piece of the spring member 280 formed in a flat spring shape, the movable module 1 is swung with a portion connected with the spring member 280 as a swing center. For example, when the spring member 280 is connected with an end part in the optical axis direction of the movable module 1, the movable module 1 is swung with a portion near the end part as a swing center. Alternatively, when the spring member 280 is connected with an intermediate portion in the optical axis direction of the movable module 1, the movable module 1 is swung with a portion near the intermediate portion as a swing center. On the other hand, when two pieces of the spring member 280 in a flat spring shape are respectively connected with two parts of the movable module 1 which are separated in the optical axis direction, the movable module 1 is swung with a portion between the connected portions with the two pieces of the spring member 280 as a swing center.

In the embodiment described above, the present invention is applied to the optical unit 200 with shake correcting function using the lens drive module 1*a* in which the lens drive coils 30*s* and 30*t* are formed in a square tube-shape and the lens drive magnet 17 is formed in a flat plate shape. However, the present invention may be applied to an optical unit with shake correcting function using a movable module in which the lens drive coils 30*s* and 30*t* are formed in a cylindrical shape, the case 18 is formed in a square tube shape, and the lens drive magnets 17 are disposed at corner portions of the case 18.

In the embodiment described above, the present invention is applied to the optical unit 200 with shake correcting function which is used in a cell phone with a camera. However, the present invention is applied to the optical unit 200 with shake correcting function which is used in a thin digital camera. Further, in the embodiment described above, the movable module 1 includes, in addition to the lens 121 and the imaging element 15, the lens drive mechanism 5 for magnetically driving the movable body 3 including the lens 121 in the optical axis "L" direction which is supported on the support body 2. However, the present invention may be applied to a fixed focus type optical unit with shake correcting function in which the lens drive mechanism 5 is not mounted on the movable module 1.

In the embodiment described above, shake correction is performed by utilizing magnetic drive. However, instead of utilizing the above-mentioned system, a voice coil system, a piezo-electric element (piezo) system, a high polymer actuator system, a stepping motor system may be utilized, and any system is appropriately selected and adopted depending on its application.

In addition, other than a cell phone or a digital camera, the optical unit 200 with shake correcting function to which the present invention is applied may be fixed in an apparatus such as a refrigerator where vibration is occurred in a certain interval and mounted so as to be capable of being remote controlled. This structure enables to provide a service in which information in the inside of the refrigerator is obtained at a visit place, for example, at the time of shopping. According to this service, since the camera system is provided with an attitude stabilizing device, i.e., the present invention, a stable image can be transmitted even when vibration may occur in the refrigerator. Further, this device may be fixed to a device such as a bag, a satchel or a cap of a child and a student which is carried at a time of commuting or attending school. In this case, the surroundings are photographed at a constant interval and, when the image is transferred to a predetermined server, the parent or the like watches the image at a remote place to secure security of the child. In this application, without being conscious of a camera, a clear image is photographed even when vibration occurs at the time of moving. Further, when a GPS is mounted in addition to a camera module, the position of a target person can be obtained simultaneously and thus, when an accident occurs, its position and situation can be confirmed immediately. In addition, when the optical unit 200 with shake correcting function to which the present invention is applied is mounted at a position which is capable of photographing toward a front side in a car, it can be used as a drive recorder. Further, it may be structured that the optical unit 200 with shake correcting function to which the present invention is applied is mounted at a position which is capable of photographing toward a front side in a car and a peripheral image is photographed automatically at a constant interval, which is automatically transferred to a predetermined server. Further, when this image is distributed while interlocking with traffic jam information in the VICS (Vehicle Information and Communication System) of a car navigation system, the situation of a traffic jam can be provided further in detail. According to this service, similarly to a drive recorder mounted on a car, the situation when an accident has occurred can be recorded by a third person of passer-by without intention to utilize an inspection of the situation. Further, a clear image can be acquired without affected by vibration of a car. In a case of this application, when a power supply is turned on, a command signal may be outputted to the control section 800 and the shake control is started on the basis of the command signal.

Further, the optical unit 200 with shake correcting function in accordance with an embodiment of the present invention may be applied to shake correction of an optical apparatus from which a light beam is emitted such as a laser beam pointer, a portable or on-vehicle projection display device and direct viewing type display device. Further, for observation with high magnification such as an astronomical telescope system or a binocular system, the optical unit 200 with shake correcting function may be used to observe without using an auxiliary locking device such as three-legged supports. Further, as an auxiliary instrument for a physically handicapped person who has trouble with hand such as continuous shaking, life support operation can be enabled by setting a writing implement or a spoon as the movable part of the present invention. In addition, when the present invention is applied to a rifle or a turret of a tank, its attitude can be stabilized against vibration at the time of triggering and thus hitting accuracy can be enhanced.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An optical unit with shake correcting function comprising:
- a movable module on which at least an optical element is mounted;
- a fixed body which supports the movable module;
- a shake detection sensor which detects a shake of the movable module;
- a drive mechanism for shake correction for swinging the movable module on the fixed body on a basis of a detection result of the shake detection sensor to correct the shake of the movable module;
- a control section which controls the drive mechanism for shake correction on the basis of the detection result of the shake detection sensor; and
- a spring member which connects the movable module with the fixed body;
- wherein the shake detection sensor is a gyroscope which is mounted on the movable module and the control section controls the drive mechanism for shake correction so as to cancel the shake detected by the gyroscope; and
- when a frequency of a control signal with which the control section controls the drive mechanism for shake correction is set to be "f1", a resonance frequency of the spring member is set to be "f2", and a detuning frequency of the gyroscope is set to be "f3", and wherein the frequency "f1" of the control signal, the resonance frequency "f2" of the spring member, and the detuning frequency "f3" of the gyroscope satisfy the following condition:
f1<f2<f3.

2. The optical unit with shake correcting function according to claim 1, wherein the frequency "f3" of the control signal is restrained by a digital low-pass filter which is provided for a digital signal obtained by means of that an angular velocity signal outputted from the gyroscope is digitized.

3. The optical unit with shake correcting function according to claim 1, wherein in an open-loop frequency characteristic of a servo gain when the drive mechanism for shake correction is controlled, a gain intersecting point satisfies the following condition:
f2<gain intersecting point<f3.

4. The optical unit with shake correcting function according to claim 1, wherein in an open-loop frequency characteristic of a servo gain when the drive mechanism for shake correction is controlled, a gain intersecting point satisfies the following condition:
f1<gain intersecting point<f2.

5. The optical unit with shake correcting function according to claim 1, wherein the control section obtains a quantity of angular displacement of the movable module on a basis of an angular velocity signal outputted from the gyroscope to control the drive mechanism for shake correction for cancelling the angular displacement.

6. The optical unit with shake correcting function according to claim 1, wherein the control section is structured in an integrated circuit which is mounted on a flexible circuit board drawn from the movable module.

7. The optical unit with shake correcting function according to claim 1, wherein the control section is accommodated in a package in which the gyroscope is accommodated.

8. The optical unit with shake correcting function according to claim 1, wherein a control by the control section is started on a basis of a command signal from outside.

9. The optical unit with shake correcting function according to claim 1, wherein the optical element is a lens, and an imaging element is mounted on a rear side with respect to the lens in the movable module.

10. The optical unit with shake correcting function according to claim 9, wherein a control of the control section is executed at a time of an operation of a photographing start switch.

11. The optical unit with shake correcting function according to claim 9, wherein a control of the control section is executed during photography by the imaging element through the lens.

12. A shake correction control method for an optical unit with shake correcting function which includes a movable module on which at least an optical element is mounted, a fixed body which supports the movable module, a shake detection sensor which detects a shake of the movable module, a drive mechanism for shake correction for swinging the movable module on the fixed body on a basis of a detection result of the shake detection sensor to correct the shake of the movable module, and a spring member which connects the movable module with the fixed body, the control method comprising:
- mounting a gyroscope on the movable module as the shake detection sensor; and
- controlling the drive mechanism for shake correction to cancel a shake detected by the gyroscope;
- wherein when a frequency of a control signal of the controlling the drive mechanism for shake correction is set to be "f1", a resonance frequency of the spring member is set to be "f2", and a detuning frequency of the gyroscope is set to be "f3", and wherein the frequency "f1" of the control signal, the resonance frequency "f2" of the spring member, and the detuning frequency "f3" of the gyroscope satisfy the following condition:
f1<f2<f3.

* * * * *